US009509462B2

(12) United States Patent
Nagata et al.

(10) Patent No.: US 9,509,462 B2
(45) Date of Patent: Nov. 29, 2016

(54) RADIO COMMUNICATION SYSTEM, USER TERMINAL, RADIO BASE STATION APPARATUS AND RADIO COMMUNICATION METHOD

(71) Applicant: NTT DOCOMO, INC., Tokyo (JP)

(72) Inventors: Satoshi Nagata, Tokyo (JP); Jing Wang, Beijing (CN); Xiang Yun, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 24 days.

(21) Appl. No.: 14/386,982

(22) PCT Filed: Mar. 21, 2013

(86) PCT No.: PCT/JP2013/058087
§ 371 (c)(1),
(2) Date: Sep. 22, 2014

(87) PCT Pub. No.: WO2013/141301
PCT Pub. Date: Sep. 26, 2013

(65) Prior Publication Data
US 2015/0085770 A1   Mar. 26, 2015

(30) Foreign Application Priority Data
Mar. 23, 2012 (JP) .................... 2012-067844

(51) Int. Cl.
*H04L 5/00* (2006.01)
*H04W 24/10* (2009.01)
(Continued)

(52) U.S. Cl.
CPC .......... *H04L 5/0035* (2013.01); *H04B 7/024* (2013.01); *H04B 7/065* (2013.01); *H04L 5/0057* (2013.01);
(Continued)

(58) Field of Classification Search
None
See application file for complete search history.

(56) References Cited

U.S. PATENT DOCUMENTS 9,237,563 B2 *  1/2016  Kim ...................... H04L 5/001
9,307,547 B2 *  4/2016  Nogami ............... H04W 24/10
(Continued)

FOREIGN PATENT DOCUMENTS

| JP | 2011-82709 A | 4/2011 |
| JP | 2011-234265 A | 11/2011 |
| JP | 2012-506671 A | 3/2012 |

OTHER PUBLICATIONS

International Search Report for corresponding International Application No. PCT/JP2013/058087, mailed Jun. 18, 2013 (2 pages).
(Continued)

*Primary Examiner* — Eunsook Choi
(74) *Attorney, Agent, or Firm* — Osha Liang LLP

(57) ABSTRACT

The present invention is designed to, upon updating CQIs that are fed back, prevent the increase of the overhead of feedback information, and still improve the accuracy of the updated CQIs when CoMP transmission is applied. The radio communication system of the present invention is formed with a plurality of radio base station apparatuses and a user terminal that is configured to be able to perform coordinated multiple point transmission/reception with the plurality of radio base station apparatuses, and the user terminal acquires channel state information of multiple cells, generates feedback information such that the channel state information of multiple cells is allotted and transmitted in a plurality of subframes, and feeds back the generated feedback information to the radio base station apparatus of one of the multiple coordinated points, using a physical uplink shared data channel.

12 Claims, 18 Drawing Sheets

(51) Int. Cl.
- *H04W 28/06* (2009.01)
- *H04W 28/16* (2009.01)
- *H04B 7/02* (2006.01)
- *H04W 4/00* (2009.01)
- *H04B 7/06* (2006.01)

(52) U.S. Cl.
CPC ............ *H04W 24/10* (2013.01); *H04W 28/06* (2013.01); *H04W 28/16* (2013.01); *H04B 7/066* (2013.01); *H04B 7/0632* (2013.01); *H04B 7/0639* (2013.01)

(56) References Cited

U.S. PATENT DOCUMENTS

| | | | |
|---|---|---|---|
| 2010/0098012 A1 | 4/2010 | Bala et al. | |
| 2012/0076028 A1* | 3/2012 | Ko | H04L 1/0026 370/252 |
| 2012/0218962 A1 | 8/2012 | Kishiyama et al. | |
| 2013/0083741 A1* | 4/2013 | Larsson | H04L 5/0094 370/329 |
| 2013/0195035 A1 | 8/2013 | Taoka et al. | |
| 2013/0201884 A1* | 8/2013 | Freda | H04W 72/005 370/278 |
| 2014/0286296 A1* | 9/2014 | Tiirola | H04L 5/001 370/329 |
| 2015/0043477 A1* | 2/2015 | Nagata | H04B 7/024 370/329 |

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).

Office Action issued in corresponding Japanese application No. 2012-067844, mailed Oct. 6, 2015 (6 pages).

\* cited by examiner

| PUSCH CQI FEEDBACK TYPE | PMI FEEDBACK TYPE | | |
|---|---|---|---|
| | NO PMI | SINGLE PMI | MULTIPLE PMI |
| WIDEBAND (WIDEBAND CQI) | | | MODE 1-2 |
| UE SELECTED (SUBBAND CQI) | MODE 2-0 | | MODE 2-2 |
| HIGHER LAYER-CONFIGURED (SUBBAND CQI) | MODE 3-0 | MODE 3-1 | |

FIG.4

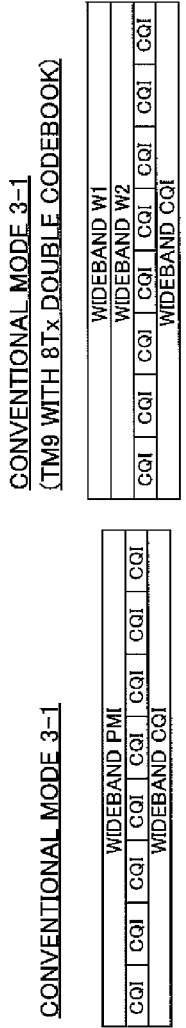
FIG.6A
FIG.6B
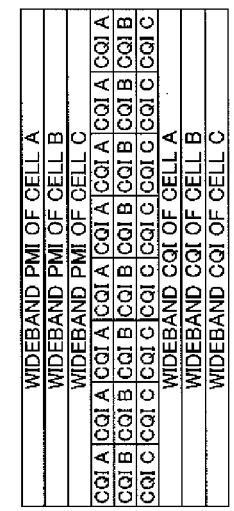
FIG.6C
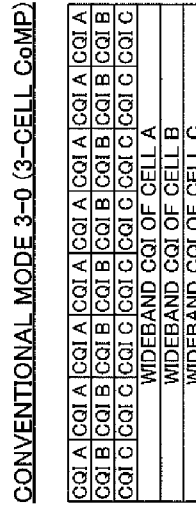
FIG.6D
FIG.6E

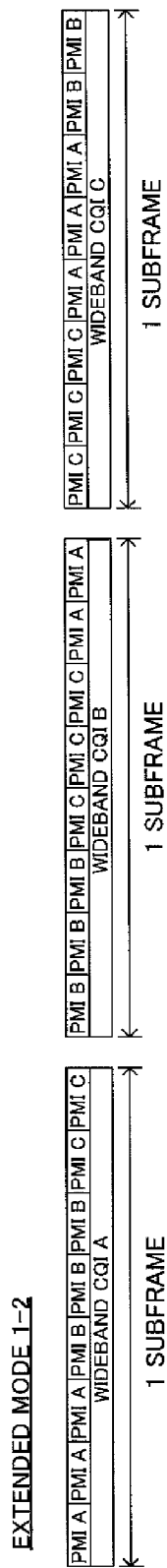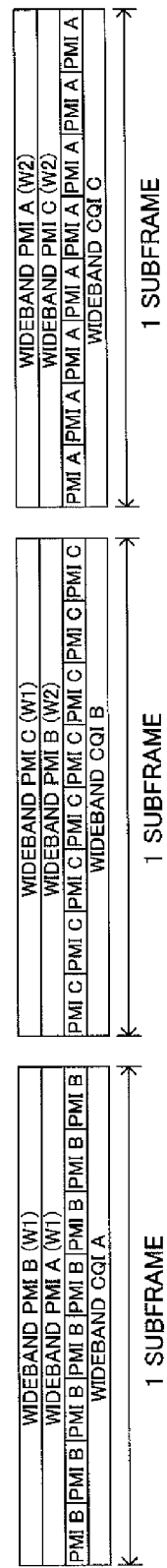

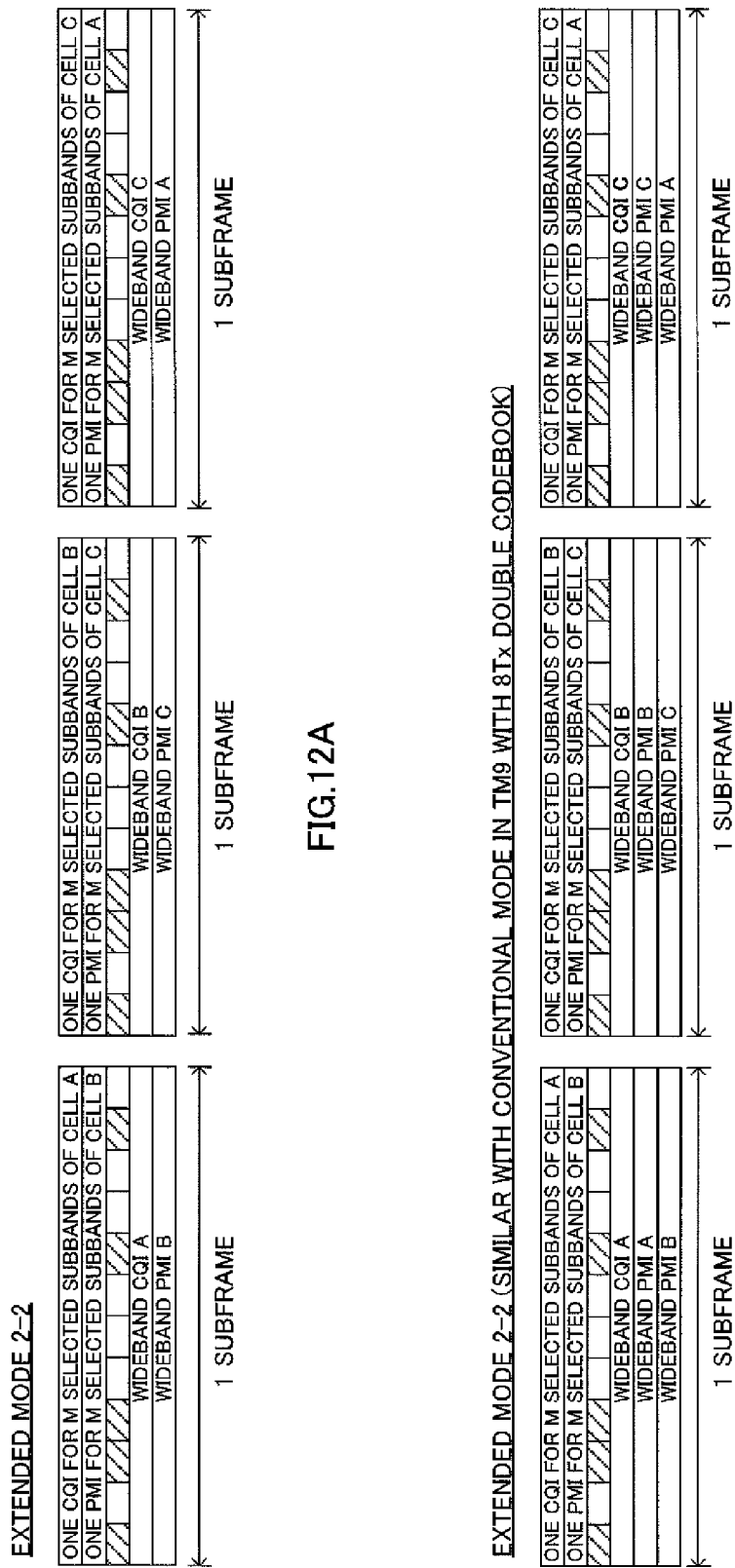

RADIO COMMUNICATION SYSTEM, USER TERMINAL, RADIO BASE STATION APPARATUS AND RADIO COMMUNICATION METHOD

TECHNICAL FIELD

The present invention relates to a radio communication system, a user terminal, a radio base station apparatus and a radio communication method that are applicable to a cellular system and so on.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, long-term evolution (LTE) is under study for the purposes of further increasing high-speed data rates, providing low delay, and so on (non-patent literature 1).

In a third-generation system, a transmission rate of maximum approximately 2 Mbps can be achieved on the downlink by using a fixed band of approximately 5 MHz. Meanwhile, in an LTE system, it is possible to achieve a transmission rate of about maximum 300 Mbps on the downlink and about 75 Mbps on the uplink, by using a variable band which ranges from 1.4 MHz to 20 MHz. Furthermore, with the UMTS network, a successor system of an LTE system is also under study for the purpose of achieving further broadbandization and higher speed (for example, "LTE-advanced" (LTE-A)).

In the LTE-A system, carrier aggregation (CA) to achieve broadbandization by aggregating a plurality of fundamental frequency blocks (CCs: Component Carriers) of different frequency bands is under study. Also, with the LTE-A system, an agreement to make a single fundamental frequency block a frequency band (for example, 20 MHz) that can be used in the LTE system has been made in order to achieve broadbandization while maintaining backward compatibility with the LTE system. For example, when five fundamental frequency blocks are aggregated, the system band becomes 100 MHz.

CITATION LIST

Non-Patent Literature

Non-Patent Literature 1: 3GPP, TR25.912 (V7.1.0), "Feasibility Study for Evolved UTRA and UTRAN," September 2006

SUMMARY OF INVENTION

Technical Problem

Now, as a promising technique for further improving the system performance of the LTE system, there is inter-cell orthogonalization. For example, in the LTE-A system, intra-cell orthogonalization is made possible by orthogonal multiple access on both the uplink and the downlink. That is to say, on the downlink, orthogonality is provided between user terminal UEs (User Equipment) in the frequency domain. On the other hand, between cells, like in W-CDMA, interference randomization by one-cell frequency re-use is fundamental.

So, in 3GPP (3rd Generation Partnership Project), coordinated multiple-point transmission/reception (CoMP) is under study as a technique for realizing inter-cell orthogonalization. In this CoMP transmission/reception, a plurality of cells coordinate and perform signal processing for transmission and reception for one user terminal UE or for a plurality of user terminal UEs. For example, for the downlink, simultaneous transmission by a plurality of cells adopting precoding, coordinated scheduling/beam forming and so on are under study. By adopting these CoMP transmission/reception techniques, improvement of throughput performance is expected, especially with respect to user terminal UEs located on cell edges.

To apply CoMP transmission/reception techniques, it is necessary to feed back channel quality indicators (CQIs) for a plurality of cells from a user terminal to a radio base station apparatus. Also, since there are various kinds of transmission modes in CoMP transmission/reception techniques, the radio base station apparatus re-calculates and updates the CQIs that are fed back, to adapt to these transmission modes. Upon such updating, it is necessary to prevent the increase of the overhead of feedback information, and still improve the accuracy of the updated CQIs.

The present invention has been made in view of the above, and it is therefore an object of the present invention to provide a radio communication system, a user terminal, a radio base station apparatus and a radio communication method, which, upon updating CQIs that are fed back when CoMP transmission is applied, can prevent the increase of the overhead of feedback information and still improve the accuracy of the updated CQIs.

Solution to Problem

The radio communication system of the present invention is a radio communication system comprising a plurality of radio base station apparatuses and a user terminal that is configured to be able to perform coordinated multiple point transmission/reception with the plurality of radio base station apparatuses, and, in this radio communication system, the user terminal has a generating section configured to generate feedback information such that channel state information of multiple cells is allotted to a plurality of subframes and transmitted, and a transmission section configured to feed back the generated feedback information to the radio base station apparatus of one of multiple coordinated points, using a physical uplink shared data channel, and the radio base station apparatus has an updating section configured to update the channel state information using the channel state information that is allotted in the plurality of subframes and fed back from the user terminal.

The user terminal of the present invention is a user terminal that is configured to be able to perform coordinated multiple point transmission/reception with a plurality of radio base station apparatuses, and this user terminal has a generating section configured to generate feedback information such that channel state information of multiple cells is allotted to a plurality of subframes and transmitted, and a transmission section configured to feed back the generated feedback information to the radio base station apparatus of one of multiple coordinated points, using a physical uplink shared data channel.

The radio base station apparatus of the present invention is a radio base station apparatus that coordinates with another radio base station apparatus and performs coordinated multiple point transmission/reception with a user terminal, and this radio base station apparatus has a determining section configured to determine a reporting mode that matches channel state information which the user terminal feeds back using a physical uplink control channel, a transmission section configured to report the determined reporting mode to the user terminal, a receiving section configured to receive channel state information of multiple cells, which the user terminal allots and transmits in multiple subframes, in accordance with the reported reporting mode, via a physical uplink shared data channel, and an updating section configured to update the channel state information using the channel state information of multiple cells that is allocated and received in multiple subframes.

The radio communication method of the present invention is a radio communication method for a plurality of radio base station apparatuses and a user terminal that is configured to be able to perform coordinated multiple point transmission/reception with the plurality of radio base station apparatuses, and this radio communication method includes the steps of, at the user terminal, generating feedback information such that channel state information of multiple cells is allotted to a plurality of subframes and transmitted, at the user terminal, feeding back the generated feedback information to the radio base station apparatus of one of multiple coordinated points, using a physical uplink shared data channel, and, at the radio base station apparatus, updating the channel state information using the channel state information that is allotted in the plurality of subframes and fed back from the user terminal.

Advantageous Effects of Invention

According to the present invention, upon updating CQIs that are fed back when CoMP transmission is applied, it is possible to prevent the increase of the overhead of feedback information, and furthermore improve the accuracy of the updated CQIs.

BRIEF DESCRIPTION OF DRAWINGS

FIG. 4 is a diagram to show the relationship between CQI/PMI feedback types and PUSCH reporting modes;

FIG. 6 provides diagrams to show CSI feedback information transmission format configurations in conventional modes 3-0 and 3-1;

FIG. 10 provides diagrams to show CSI feedback information transmission format configurations in extended PUSCH reporting modes (mode 1-2), (mode 1-2, transmission mode 9);

FIG. 12 provides diagrams to show CSI feedback information transmission format configurations in extended PUSCH reporting modes (mode 2-2), (mode 2-2, transmission mode 9);

DESCRIPTION OF EMBODIMENTS

Figure 1A:
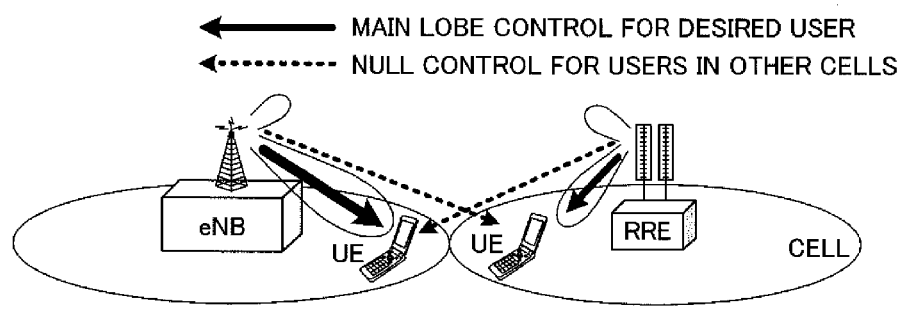
FIG. 1 provides diagrams to explain coordinated multiple point transmission.
Figure 1B:
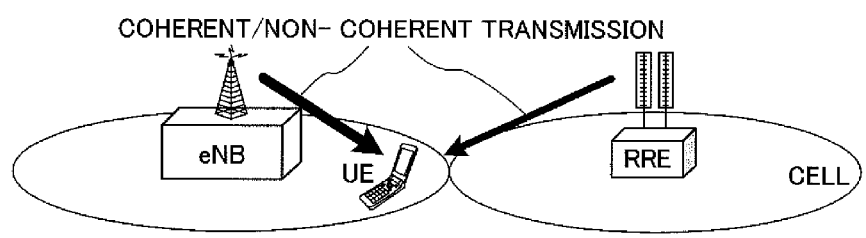
Figure 1C:
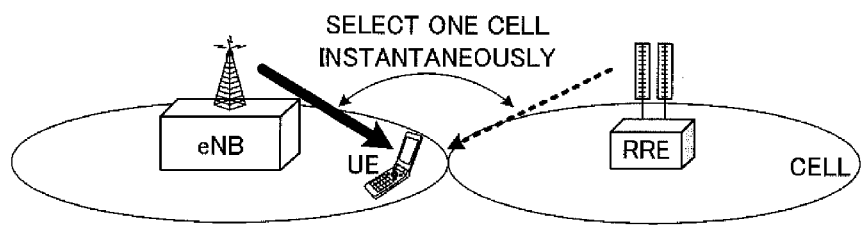

Now, an embodiment of the present invention will be described below in detail with reference to the accompanying drawings. First, downlink CoMP transmission will be described using FIG. 1. Downlink CoMP transmission includes coordinated scheduling/coordinated beamforming (CS/CB), and joint processing. Coordinated scheduling/coordinated beamforming refers to the method of transmitting a shared data channel to one user terminal UE from only one cell, and, as shown in FIG. 1A, allocates radio resources in the frequency/space domain, taking into account interference from other cells and interference against other cells. Meanwhile, joint processing refers to the method of transmitting a shared data channel from a plurality of cells, at the same time, by applying precoding, and includes joint transmission to transmit a shared data channel from a plurality of cells to one user terminal UE as shown in FIG. 1B, and dynamic point selection (DPS) to select one cell instantaneously and transmit a shared data channel as shown in FIG. 1C. There is also a transmission mode referred to as dynamic point blanking (DPB), which stops data transmission in a certain region with respect to a transmission point that causes interference.

Figure 2A:
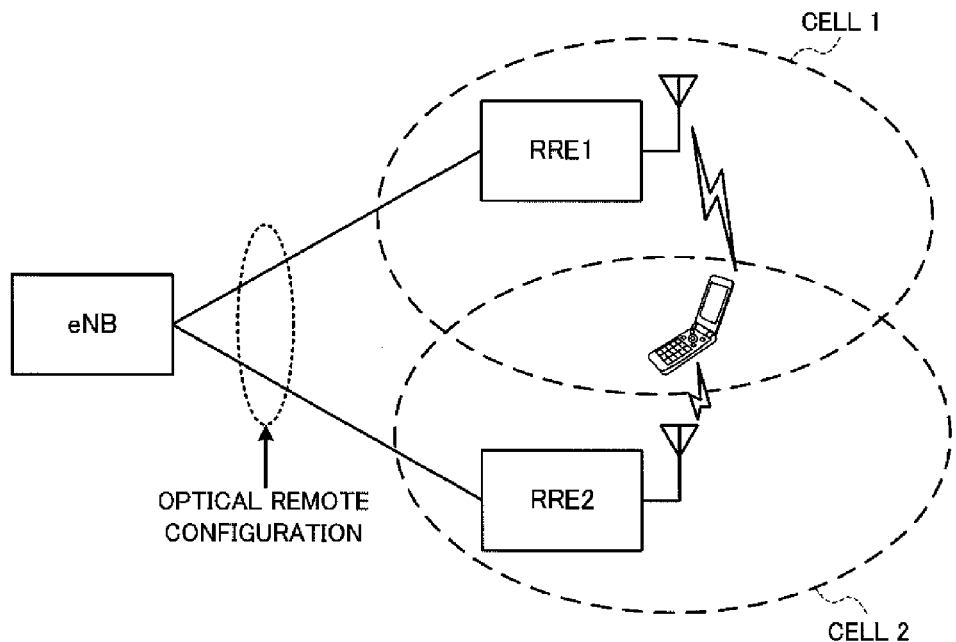
FIG. 2 provides schematic diagrams to show configurations of radio base station apparatuses that are adopted in coordinated multiple point transmission/reception.
Figure 2B:
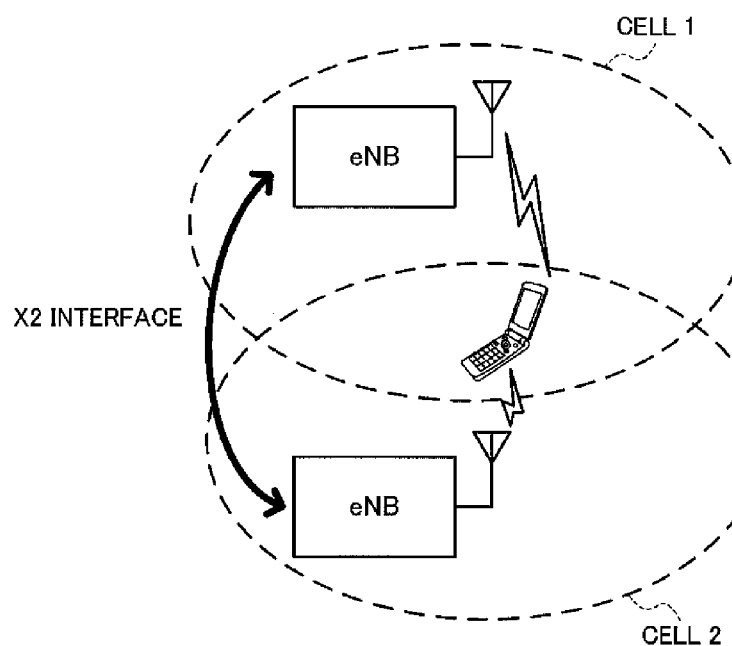

As for the configuration to implement CoMP transmission/reception, there are, for example, a configuration (centralized control based on an RRE configuration) to include a plurality of remote radio equipment (RREs) that are connected with a radio base station apparatus (radio base station apparatus eNB) by optical fiber and so on as shown in FIG. 2A, and a configuration (autonomous distributed control based on an independent base station configuration) of a radio base station apparatus (radio base station apparatus eNB) as shown in FIG. 2B. Note that, although FIG. 2A shows a configuration to include a plurality of remote radio equipment RREs, it is equally possible to use a configuration to include only single remote radio equipment RRE, as shown in FIG. 1.

In the configuration shown in FIG. 2A (RRE configuration), remote radio equipment RRE 1 and RRE 2 are controlled in a centralized fashion in a radio base station apparatus eNB. In the RRE configuration, the radio base station apparatus eNB (central base station) that performs baseband signal processing and control for a plurality of remote radio equipment RREs, and each cell (that is, each remote radio equipment RRE) are connected by baseband signals using optical fiber, so that it is possible to execute radio resource control between the cells in the central base station altogether. That is, the problems of signaling delay and overhead between radio base station apparatus eNBs, which become problems in an independent base station configuration, are insignificant, and high-speed radio resource control between cells becomes comparatively easy. Consequently, in the RRE configuration, it is possible to apply a method to use fast signal processing between cells such as simultaneous transmission of a plurality of cells, to the downlink.

On the other hand, in the configuration shown in FIG. 2B (independent base station configuration), a plurality of radio base station apparatus eNBs (or RREs) each perform radio resource allocation control such as scheduling. In this case, timing information and radio resource allocation information such as scheduling are transmitted to one radio base station apparatus eNB, if necessary, using the X2 interface between the radio base station apparatus eNB of cell 1 and the radio base station apparatus eNB of cell 2, for coordination between the cells.

CoMP transmission is applied to improve the throughput of user terminals located on cell edges. Consequently, control is executed to apply CoMP transmission when there is a user terminal located on a cell edge. In this case, a radio base station apparatus determines the difference between the quality information of each cell (for example, RSRP (Reference Signal Received Power), RSRQ (Reference Signal Received Quality), or SINR (Signal-to-Interference plus Noise Ratio) from the user terminal, and, when the difference is equal to or less than a threshold value—that is, when there is little difference in quality between cells—decides that the user terminal is located on a cell edge, and applies CoMP transmission. On the other hand, when the difference between the quality information of each cell exceeds a threshold value—that is, when there are significant quality differences between cells—the radio base station apparatus decides that the user terminal is close to the radio base station apparatus of one cell and that the user terminal is near the center of a cell, and does not apply CoMP transmission.

When CoMP transmission is applied, the user terminal feeds back channel state information (CSI) for each of a plurality of CoMP cells to the radio base station apparatus (the radio base station apparatus of the serving cell). Also, the radio base station apparatus calculates CQIs for CoMP using each cell's CSI (in particular, CQI: Channel Quality Indicator) that is fed back, and updates the CSI for CoMP (for example, CQI). At this time, to place the updated value of CSI in the latest state, there is a demand not to increase the overhead of feedback information, and yet improve the accuracy of the updated CQIs, upon sending feedback.

Figure 3:
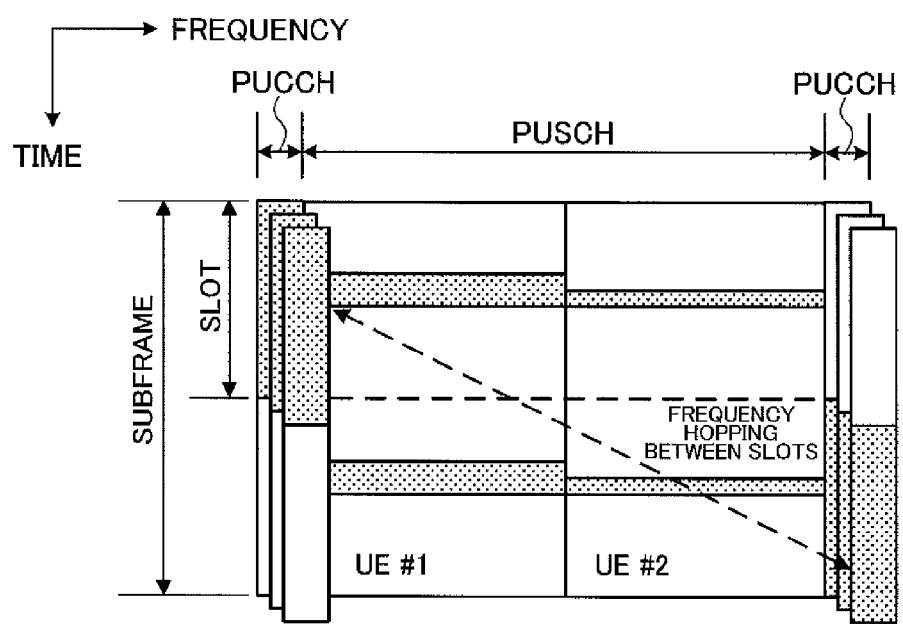
FIG. 3 is a diagram to show a channel configuration of uplink radio resources.

As shown in FIG. 3, signals to be transmitted on the uplink are mapped to adequate radio resources and transmitted from a mobile terminal apparatus to a radio base station apparatus. In this case, user data (UE #1 and UE #2) is allocated to an uplink shared channel (PUSCH: Physical Uplink Shared Channel). Also, when control information is transmitted at the same time with user data, the control information is time-multiplexed with the PUSCH, and, when control information alone is transmitted, the control information is allocated to an uplink control channel (PUCCH: Physical Uplink Control Channel). This control information to be transmitted on the uplink includes downlink quality information (for example, CQI), retransmission acknowledgement signals (ACK/NACK) in response to downlink shared channel (PDSCH: Physical Downlink Shared Channel) signals, and so on.

As described above, as CSI feedback methods, in the LTE system (Rel-10), there are a method of sending feedback periodically using an uplink control channel (PUCCH) (periodic CSI reporting using the PUCCH), and a method of sending feedback aperiodically using an uplink shared channel (PUSCH) (aperiodic CSI reporting using the PUSCH).

In the LTE-A system, carrier aggregation (CA) to achieve broadbandization by aggregating a plurality of fundamental frequency blocks (component carriers (CCs)) of different frequency bands is applied. Also, in uplink transmission, carrying out uplink data transmission using a single fundamental frequency block to achieve single-carrier characteristics is under study.

In this case, the capacity of PUSCH resources in one subframe is large, so that feedback information (CSI) in response to signals transmitted from multiple cells on the downlink is fed back in one transmission (one subframe) using the PUSCH. Even while CoMP transmission/reception is applied, when the CSI of each of a plurality of CoMP cells is fed back to the radio base station apparatus of a predetermined cell (serving cell) using the PUSCH, the CSI of the cells is reported in one transmission (one subframe) using the PUSCH.

Consequently, when CoMP transmission/reception is carried out with multiple cells (for example, three cells), the overhead of feedback information becomes bigger, and there is a threat that the radio resources to use for other uplink data signals become scarce in the subframes to transmit the feedback information.

The present inventors have made an earnest study taking into account the above-described points, and found out that, when a user terminal feeds back CSI in a plurality of CoMP cells using the PUSCH, it is possible to reduce the overhead of feedback information by controlling the number of times of transmission and by controlling the combinations of signals. Furthermore, the present inventors have found out that it is possible to adequately feed back CSI in a plurality of CoMP cells by extending conventional formats.

Now, CSI (CQI and PMI) feedback types in CSI feedback applying the PUSCH will be described below. FIG. 4 is a diagram to show the relationship between CQI/PMI feedback types and PUSCH reporting modes. The CQI feedback types can indicate the case where the CQI to feed back corresponds to a wideband (system band), the case where the CQI to feed back corresponds to a subband selected by a user terminal, and the case where the CQI to feed back corresponds to a subband designated by a radio base station apparatus by a higher layer signal. Also, the PMI feedback types can indicate the case where there is no PMI to feed back, the case where there is one PMI to feed back, and the case where there are multiple PMIs to feed back. Rel-10 provides for a mode (mode 1-2) combining a CQI feedback type to feed back the CQI of the wideband (hereinafter referred to as "WB CQI") and a PMI feedback type to feed back a plurality of PMIs, a mode (mode 2-0) combining a CQI feedback type to feed back the CQI of a subband selected by a user terminal (hereinafter referred to as "SB CQI") and a PMI feedback type not to feed back a PMI, a mode (mode 2-2) combining a CQI feedback type to feed back an SB CQI designated by a higher layer signal and a PMI feedback type to feed back a plurality of PMIs, a mode (mode 3-0) combining a CQI feedback type to feed back an SB CQI designated by a higher layer signal and a PMI feedback type not to feed back a PMI, and a mode (mode 3-1) combining a CQI feedback type to feed back an SB CQI designated by a higher layer signal and a PMI feedback type to feed back one PMI.

(Feedback to Apply the PUSCH)

<First Mode: Extended Mode 3-0>

First, the overhead when a conventional PUSCH reporting mode (mode 3-0) is applied will be described.

Figure 5:
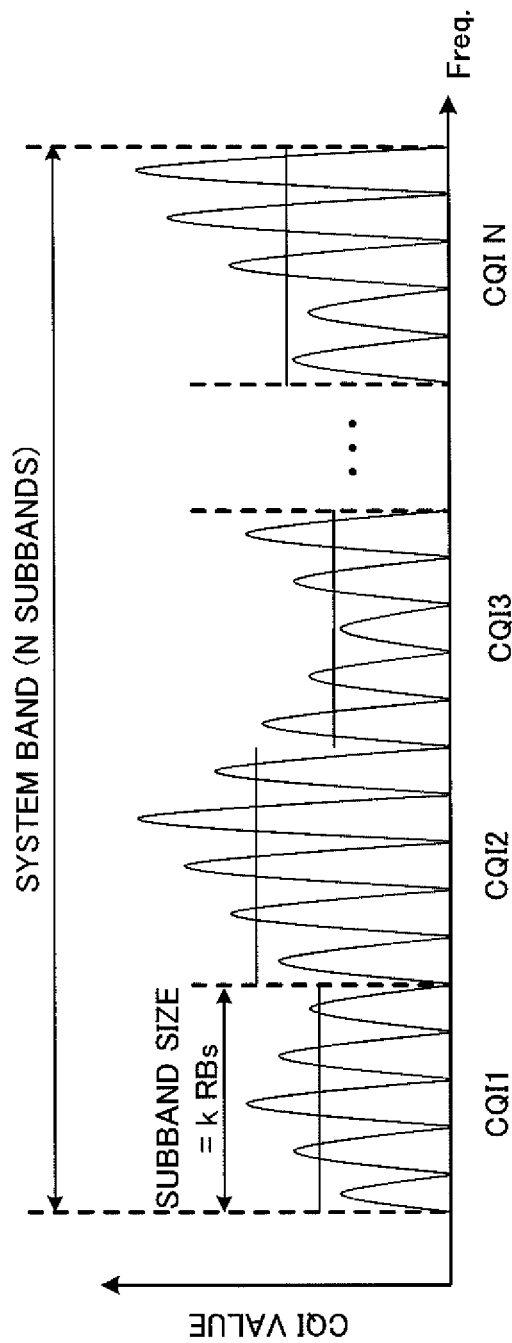
FIG. 5 is a diagram to explain a periodic CQI reporting method.

As shown in FIG. 5, the system band is formed with N subbands, and one subband is formed with k RBs (Resource Blocks). A user terminal finds the CQI value of each of the N subbands (SB CQIs: CQI 1, CQI 2 . . . CQI N) and also finds the CQI value of the wideband (WB CQI). A CQI report is triggered aperiodically, and, in one subframe, the CQI values of the N subbands (CQI 1, CQI 2 . . . CQI N), the CQI value of the wideband (WB CQI), and RI are fed back using the PUSCH. In the conventional PUSCH reporting mode (mode 3-0), for every one cell, for example, WB CQI (4 bits)+SB CQI (2N bits)+RI (0-2 bits)=(4-6+2N) bits are transmitted in one subframe using the PUSCH. When CQIs for multiple cells are fed back for CoMP, (4-6+2N) bits×bit information of multiple cells are transmitted in one time (one subframe) using the PUSCH.

FIGS. 6A and 6B show a format configuration for transmitting CSI feedback information for one cell (FIG. 6A) in a conventional PUSCH reporting mode (mode 3-0), and a format configuration for transmitting CSI feedback information upon three-cell CoMP (cells A, B and C) (FIG. 6B). For every one cell, SB CQIs of eight subbands and a WB CQI of one system band are arranged in PUSCH resources in one subframe. As shown in this drawing, as the number of cells increases, the CSI feedback information to be arranged in the PUSCH resources in one subframe increases, and the overhead of uplink feedback information increases.

Next, a new PUSCH reporting mode (extended mode 3-0), which is given by extending the conventional PUSCH reporting mode (mode 3-0) to reduce the overhead, will be described with reference to FIG. 7.

In the new PUSCH reporting mode (extended mode 3-0), CSI information of multiple cells (WB CQIs and SB CQIs), which is transmitted in one subframe in the conventional PUSCH reporting mode, is allotted to PUSCHs in a plurality of subframes and transmitted. As shown in FIG. 7, when CoMP by three cells A, B and C is applied, in the PUSCH resources to be transmitted in the first subframe, the WB CQI of cell A, the CQIs of three subbands of cell A (CQI A×3), the CQIs of three subbands of cell B (CQI B×3), and the CQIs of two subbands of cell C (CQI C×2) are arranged. In the PUSCH resources to be transmitted in a second subframe, which is the next subframe following the first subframe, the WB CQI of cell B, the CQIs of three subbands among the rest of the subbands of cell B (CQI B×3), the CQIs of three subbands among the rest of the subbands of cell C (CQI C×3), and the CQIs of two subbands among the rest of the subbands of cell A (CQI A×2) are arranged. Furthermore, in the PUSCH resources to be transmitted in a third subframe, which is the next subframe following the second subframe, the WB CQI of cell C, the CQIs of the remaining three subbands of cell C (CQI C×3), the CQIs of the remaining three subbands of cell A (CQI A×3), and the CQIs of the remaining two subbands of cell B (CQI B×2) are arranged.

The radio base station apparatus reports the new PUSCH reporting mode (extended mode 3-0) to a user terminal by means of a higher layer signal. In the new PUSCH reporting mode (extended mode 3-0), either a periodic PUSCH or an aperiodic PUSCH is reported as the PUSCH to use for CSI feedback. The radio base station apparatus is able to allocate a periodic PUSCH to uplink radio resources by, for example, triggering the PUSCH periodically. Alternatively, the radio base station apparatus may transmit PUSCH triggering bits to the user terminal by means of a downlink control signal (PDCCH) or a higher layer signal with arbitrary timing, and the user terminal may receive the PUSCH triggering bits and allocate the PUSCH periodically only for a certain period of time. The radio base station apparatus may also transmit triggering bits for triggering the aperiodic PUSCH to the user terminal through a downlink control signal (PDCCH). Upon detecting the aperiodic PUSCH triggering bits from the downlink control signal (PDCCH), the user terminal allocates the PUSCH to uplink radio resources. Since CSI feedback information for multiple cells is allotted to PUSCHs in a plurality of subframes and transmitted, once the aperiodic PUSCH is triggered, PUSCH transmission is carried out for a plurality of subframes. In another extended PUSCH reporting mode to be described later, CSI feedback information is transmitted using a periodic PUSCH or an aperiodic PUSCH as well.

Figure 7:
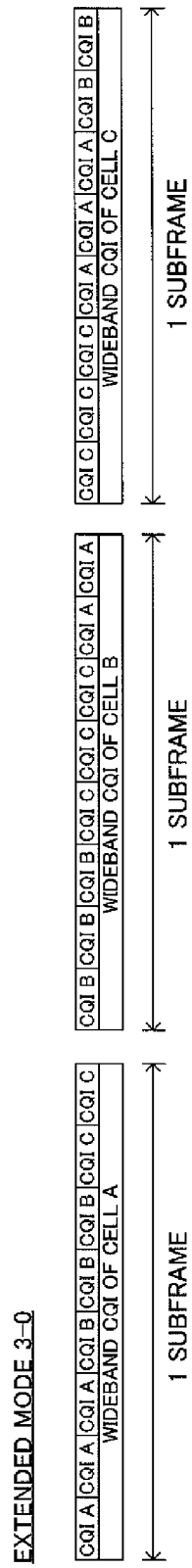
FIG. 7 is a diagram to show a CSI feedback information transmission format configuration in an extended PUSCH reporting mode (mode 3-0)

A user terminal where the new PUSCH reporting mode (extended mode 3-0) is applied allots and transmits CSI information of multiple cells (WB CQIs and SB CQIs) in a plurality of subframes, as shown in FIG. 7. The radio base station apparatus acquires the CSI of multiple cells from the PUSCHs received on the uplink. At the time three subframes of PUSCHs have been received, the CSI information of multiple cells A, B and C (WB CQIs and SB CQIs) is complete.

By this means, according to the new PUSCH reporting mode (extended mode 3-0), compared to the amount of information of CSI feedback information with the conventional PUSCH reporting mode (mode 3-0) shown in FIG. 6B, the amount of information of CSI feedback information per feedback is reduced to approximately ⅓ (by 66.7%).

<Second Mode: Extended Mode 3-1>

First, the overhead when a conventional PUSCH reporting mode (mode 3-1) is applied will be described.

In the conventional PUSCH reporting mode (mode 3-1), a user terminal finds the CQI value of each of N subbands (CQI 1, CQI 2 . . . CQI N) and also finds the CQI value of the wideband (WB CQI). Furthermore, the user terminal finds the PMI of the wideband. A CQI report is triggered aperiodically, and, in one subframe, the CQI values of N subbands (CQI 1, CQI 2 . . . CQI N), the CQI value of the wideband (WB CQI), and the PMI and RI of the wideband are fed back using the PUSCH. In the conventional PUSCH reporting mode (mode 3-1), for one cell, for example, a WB CQI (4 or 8 bits)+SB CQIs (2N or 4N bits)+a PMI (2 or 4 bits)+an RI (0-2 bits) are transmitted in one subframe using the PUSCH.

In FIGS. 6C and 6D, a format configuration for transmitting CSI feedback information of one cell (FIG. 6C) in the conventional PUSCH reporting mode (mode 3-1), and a format configuration for transmitting CSI feedback information upon three-cell CoMP (cells A, B and C) (FIG. 6D) are shown. For every one cell, SB CQIs of eight subbands, one WB CQI, and one WB PMI are arranged in the PUSCH resources in one subframe. As shown in this drawing, as the number of cells increases, the CSI feedback information to be arranged in the PUSCH resources in one subframe increases, and the overhead of uplink feedback information increases.

Next, a new PUSCH reporting mode (extended mode 3-1), which is given by extending the conventional PUSCH reporting mode (mode 3-1) to reduce the overhead, will be described with reference to FIG. 8.

In the new PUSCH reporting mode (extended mode 3-1), CSI information of multiple cells (WB CQIs, WB PMIs and SB CQIs) is allotted to PUSCHs in a plurality of subframes and transmitted. As shown in FIG. 8, when CoMP by three cells A, B and C is applied, in the PUSCH resources to be transmitted in the first subframe, the WB PMI of cell A (PMI A), the WB CQI of cell A (CQI A), the SB CQIs of three subbands of cell A (CQI A×3), the SB CQIs of three subbands of cell B (CQI B×3), and the SB CQIs of two subbands of cell C (CQI C×2) are arranged. In the PUSCH resources to be transmitted in a second subframe, the WB PMI of cell B (PMI B), the WB CQI of cell B (CQI B), the CQIs of three subbands among the rest of the SB CQIs of cell B (CQI B×3), the CQIs of three subbands among the rest of the SB CQIs of cell C (CQI C×3), and the CQIs of two subbands among the rest of the SB CQIs of cell A (CQI A×2) are arranged. Furthermore, in the PUSCH resources to be transmitted in a third subframe, the WB PMI of cell C (PMI C), the WB CQI of cell C (CQI B), the SB CQIs of the remaining three subbands of cell C (CQI C×3), the SB CQIs of the remaining three subbands of cell A (CQI A×3), and the SB CQIs of the remaining two subbands of cell B (CQI B×2) are arranged.

Figure 8:
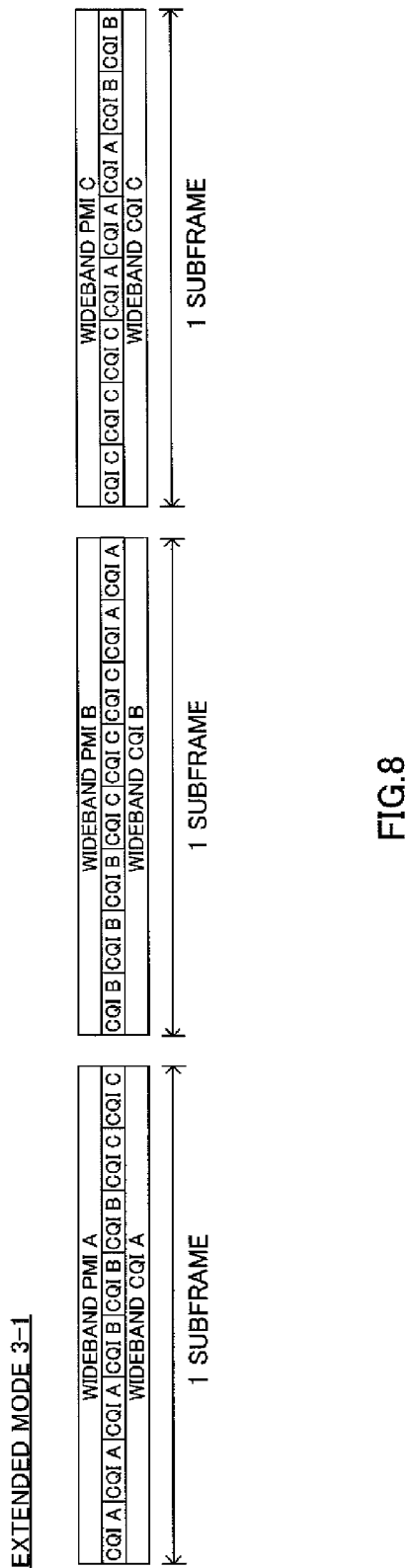
FIG. 8 is a diagram to show a CSI feedback information transmission format configuration in an extended PUSCH reporting mode (mode 3-1)

A user terminal where the new PUSCH reporting mode (extended mode 3-1) is applied allots and transmits CSI information of multiple cells (WB PMIs, WB CQIs and SB CQIs) in a plurality of subframes, as shown in FIG. 8. The radio base station apparatus acquires the CSI of multiple cells from the PUSCHs received on the uplink. At the time three subframes of PUSCHs have been received, the CSI information of multiple cells A, B and C (WB PMIs, WB CQIs and SB CQIs) is complete.

By this means, according to the new PUSCH reporting mode (extended mode 3-1), compared to the amount of information of CSI feedback information with the conventional PUSCH reporting mode (mode 3-1) shown in FIG. 6D, the amount of information of CSI feedback information per feedback is reduced to approximately ⅓ (by 66.7%).

<Third Mode: Extended Mode 3-1 (Transmission Mode 9 Using a Double Codebook)>

When the conventional PUSCH reporting mode (mode 3-1, transmission mode 9 using a double codebook) is applied, two kinds of WB PMIs (W1 and W2) are included in CSI feedback information as shown in FIG. 6E. Consequently, in the conventional PUSCH reporting mode (mode 3-1, transmission mode 9 using a double codebook), for every one cell, the CQI values of N subbands (CQI 1, CQI 2 . . . CQI N), the CQI value of the wideband (WB CQI), two kinds of WB PMI (W1) and WB PMI (W2) are produced as CSI feedback information. When a user terminal tries to feed back CSI information of multiple cells for CoMP in one subframe using the PUSCH, the overhead of the CSI feedback information increases.

Next, a new PUSCH reporting mode (extended mode 3-1, transmission mode 9 using a double codebook), which is given by extending the conventional PUSCH reporting mode (mode 3-1, transmission mode 9 using a double codebook) to reduce the overhead, will be described with reference to FIG. 9.

In the new PUSCH reporting mode (extended mode 3-1, transmission mode 9 using a double codebook), CSI information of multiple cells (WB CQIs, WB PMIs (W1 and W2) and SB CQIs) is distributed over a plurality of subframes and transmitted. As shown in FIG. 9, when CoMP by three cells A, B and C is applied, in the PUSCH resources to be transmitted in the first subframe, the WB PMI of cell A (PMI A (W1)), the WB PMI of cell B (PMI B (W1)), the WB CQI of cell A (CQI A), and the SB CQIs of eight subbands of cell B (CQI B×8) are arranged. In the PUSCH resources to be transmitted in a second subframe, the WB PMI of cell C (PMI C (W1)), the WB PMI of cell B (PMI B (W2)), the WB CQI of cell B (CQI B), and the SB CQIs of eight subbands of cell C (CQI C×8) are arranged. In the PUSCH resources to be transmitted in a third subframe, the WB PMI of cell A (PMI A (W2)), the WB PMI of cell C (PMI C (W2)), the WB CQI of cell C (CQI C), and the SB CQIs of eight subbands of cell A (CQI A×8) are arranged.

Figure 9:
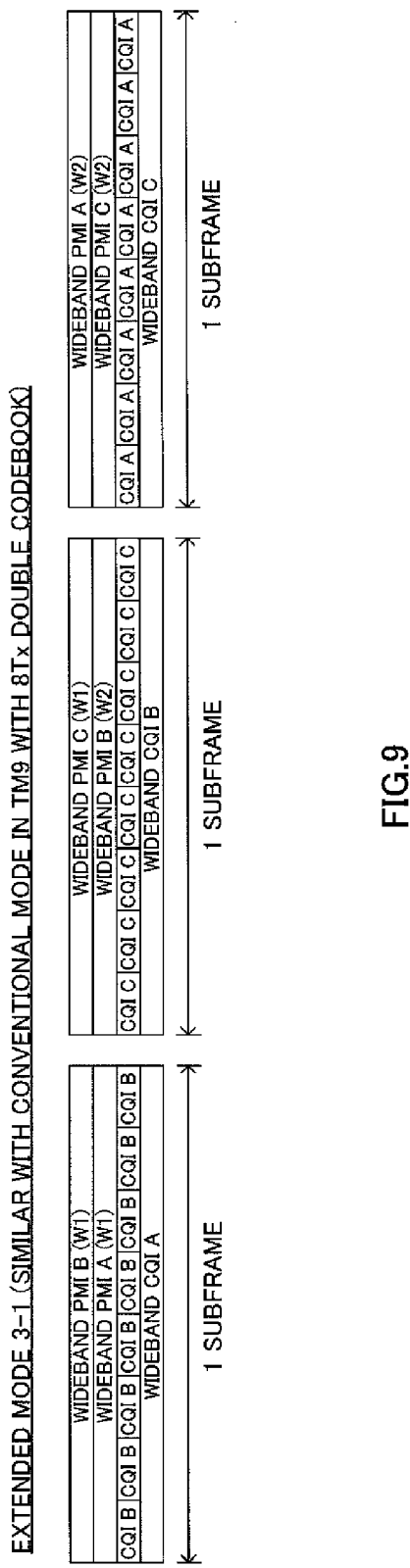
FIG. 9 is a diagram to show a CSI feedback information transmission format configuration in an extended PUSCH reporting mode (mode 3-1, transmission mode 9)

A user terminal where the new PUSCH reporting mode (extended mode 3-1, transmission mode 9 using a double codebook) is applied allots and transmits CSI information of multiple cells (WB PMI (W1), WB PMI (W2), WB CQIs and SB CQIs) to PUSCHs in a plurality of subframes as shown in FIG. 9. The radio base station apparatus acquires the CSI of multiple cells from the PUSCHs received on the uplink. At the time three subframes of PUSCHs have been received, the CSI information of multiple cells A, B and C (WB PMI (W1), WB PMI (W2), WB CQIs and SB CQIs) is complete.

By this means, according to the new PUSCH reporting mode (extended mode 3-1, transmission mode 9 using a double codebook), compared to the amount of information of CSI feedback information with the conventional PUSCH reporting mode (mode 3-1, transmission mode 9 using a double codebook), the amount of information of CSI feedback information per feedback is reduced to approximately ⅓ (by 66.7%).

<Fourth Mode: Extended Mode 1-2>

Next, a new PUSCH reporting mode (extended mode 1-2), which is given by extending a conventional PUSCH reporting mode (mode 1-2) to reduce the overhead, will be described with reference to FIG. 10A.

In the conventional PUSCH reporting mode (mode 1-2), a wideband CQI value (WB CQI), which gives the average of the CQI values of N subbands, and each subband's optimal PMI are reported. In this way, this mode makes it possible to report PMIs with fine accuracy of subband units. A CQI report is triggered aperiodically, and the CQI of the wideband, the SB PMI of each subband (PMI 1, PMI 2 . . . PMI N), subband position information of the SB PMIs, and RI are fed back to the radio base station apparatus in one subframe using the PUSCH. In the conventional PUSCH reporting mode (mode 1-2), for every one cell, for example, a WB CQI (4 or 8 bits)+SB PMIs (2N or 4N bits)+an RI (0-2 bits) are transmitted in one subframe using the PUSCH. In the conventional PUSCH reporting mode (mode 1-2), as the number of cells increases, the CSI feedback information of the CQI report to be arranged in the PUSCH resources in one subframe increases, and the overhead of uplink feedback information increases.

In the new PUSCH reporting mode (extended mode 1-2), CSI information of multiple cells (WB CQIs, SB PMI 1, SB PMI 2 . . . SB PMI N) is distributed over a plurality of subframes and transmitted. As shown in FIG. 10A, when CoMP by three cells A, B and C is applied, in the PUSCH resources to be transmitted in the first subframe, the WB CQI of cell A, the SB PMIs of three subbands of cell A (PMI A×3), the SB PMIs of three subbands of cell B (PMI B)×3), and the SB PMIs of two subbands of cell C (PMI C×2) are arranged. In the PUSCH resources to be transmitted in a second subframe, the WB CQI of cell B, the SB PMIs of three subbands among the rest of the subbands of cell B (PMI B×3), the SB PMIs of three subbands among the rest of the subbands of cell C (PMI C×3), and the SB PMIs of two subbands among the rest of the subbands of cell A (PMI A×2) are arranged. Furthermore, in the PUSCH resources to be transmitted in a third subframe, the WB CQI of cell C, the SB PMIs of three subbands among the rest of the subbands of cell C (PMI C×3), the SB PMIs of three subbands among the rest of the subbands of cell A (PMI A×3), and the SB PMIs of two subbands among the rest of the subbands of cell B (PMI B×2) are arranged.

A user terminal where the new PUSCH reporting mode (extended mode 1-2) is applied allots and transmits CSI information of multiple cells (WB CQIs and SB PMIs) to PUSCHs in a plurality of subframes as shown in FIG. 10A. The radio base station apparatus acquires the CSI of multiple cells from the PUSCHs received on the uplink. At the time three subframes of PUSCHs have been received, the CSI information of multiple cells A, B and C (WB CQIs and SB PMIs) is complete.

By this means, according to the new PUSCH reporting mode (extended mode 1-2), compared to the amount of information of CSI feedback information with the conventional PUSCH reporting mode (mode 1-2), the amount of information of CSI feedback information per feedback can be reduced.

<Fifth Mode: Extended Mode 1-2, Transmission Mode 9 Using a Double Codebook>

When the conventional PUSCH reporting mode (mode 1-2, transmission mode 9 using a double codebook) is applied, CSI feedback information includes two kinds of WB PMIs (W1 and W2) for every one cell. Consequently, in the conventional PUSCH reporting mode (mode 1-2, transmission mode 9 using a double codebook), for every one cell, the SB PMIs of N subbands (PMI 1, PMI 2 . . . PMI N), the CQI value of the wideband (WB CQI), and two kinds of WB PMI (W1) and WB PMI (W2) are produced as CSI feedback information. There is a problem that, when a user terminal tries to feed back CSI information of multiple cells in one subframe using the PUSCH for CoMP, the overhead of the CSI feedback information increases.

A new PUSCH reporting mode (extended mode 1-2, transmission mode 9 using a double codebook), which is given by extending the conventional PUSCH reporting mode (mode 1-2, transmission mode 9 using a double codebook) to reduce the overhead, will be described with reference to FIG. 10B.

In the new PUSCH reporting mode (extended mode 1-2, transmission mode 9 using a double codebook), CSI information of multiple cells (WB CQIs, WB PMIs (W1 and W2), and SB PMIs) is allotted to a plurality of subframes and transmitted. As shown in FIG. 10B, when CoMP by three cells A, B and C is applied, in the PUSCH resources to be transmitted in the first subframe, the WB PMI of cell A (PMI A (W1)), the WB PMI of cell B (PMI B (W1)), the WB CQI of cell A (CQI A), and the SB PMIs of eight subbands of cell B (PMI B×8) are arranged. In the PUSCH resources to be transmitted in a second subframe, the WB PMI of cell C (PMI C (W1)), the WB PMI of cell B (PMI B (W2)), the WB CQI of cell B (CQI B), and the SB PMIs of eight subbands of cell C (SB PMI C×8) are arranged. Furthermore, in the PUSCH resources to be transmitted in a third subframe, the WB PMI of cell A (PMI A (W2)), the WB PMI of cell C (PMI C (W2)), the WB CQI of cell C (CQI C), and the SB PMIs of eight subbands of cell A (SB PMI A×8) are arranged.

A user terminal where the new PUSCH reporting mode (extended mode 1-2, transmission mode 9 using a double codebook) is applied allots and transmits CSI information of multiple cells (WB PMI (W1), WB PMI (W2), WB CQIs and SB PMIs) to PUSCHs in a plurality of subframes as shown in FIG. 10B. The radio base station apparatus acquires the CSI of multiple cells from the PUSCHs received on the uplink. At the time three subframes of PUSCHs have been received, the CSI information of multiple cells A, B and C (WB PMI (W1), WB PMI (W2), WB CQIs and SB PMIs) is complete.

By this means, according to the new PUSCH reporting mode (extended mode 1-2, transmission mode 9 using a double codebook), compared to the amount of information of CSI feedback information with the conventional PUSCH reporting mode (mode 1-2, transmission mode 9 using a double codebook), the amount of information of CSI feedback information per feedback can be reduced.

<Sixth Mode: Extended Mode 2-0>

Next, a new PUSCH reporting mode (extended mode 2-0), which is given by extending a conventional PUSCH reporting mode (mode 2-0) to reduce the overhead, will be described with reference to FIG. 11.

In the conventional PUSCH reporting mode (mode 2-0), a user terminal selects M subbands having greater CQI values from N subbands, and reports the average value (SB CQI) of the CQI values of the M selected subbands, position information of the M selected subbands, and WB CQI, which gives the average CQI of the entire band. Although RI is reported in addition, the number of bits varies depending on user categories. For every one cell, the user terminal feeds back a WB CQI (4 bits)+SB CQIs (2 bits)+SB position information (L bits)+an RI (0-2 bits)=(6~8+L) bits to the radio base station apparatus in one subframe using the PUSCH. Consequently, there is a problem that, when the user terminal tries to feed back CSI information of multiple cells in one subframe using the PUSCH for CoMP, the overhead of the CSI feedback information increases.

A new PUSCH reporting mode (extended mode 2-0), which is given by extending a conventional PUSCH reporting mode (mode 2-0) to reduce the overhead, will be described with reference to FIG. 11.

In the new PUSCH reporting mode (extended mode 2-0), CSI information of multiple cells (WB CQIs, SB position information, and SB CQIs to be the average CQI value of M selected subbands) is allotted to PUSCHs in a plurality of subframes and transmitted. As shown in FIG. 11, when CoMP by three cells A, B and C is applied, in the PUSCH resources to be transmitted in the first subframe, the WB CQI of cell A, the average CQI value of M subbands selected in cell B (CQI), and position information of the M subbands selected in cell B (the parts of diagonal lines in FIG. 11) are arranged. In the PUSCH resources to be transmitted in a second subframe, the WB CQI of cell B, the average CQI value of M subbands selected in cell C (CQI), and position information of the M subbands selected in cell C (the parts of diagonal lines in FIG. 11) are arranged. Furthermore, in the PUSCH resources to be transmitted in a third subframe, the WB CQI of cell C, the average CQI value of M subbands selected in cell A (CQI), and position information of the M subbands selected in cell A (the parts of diagonal lines in FIG. 11) are arranged.

Figure 11:
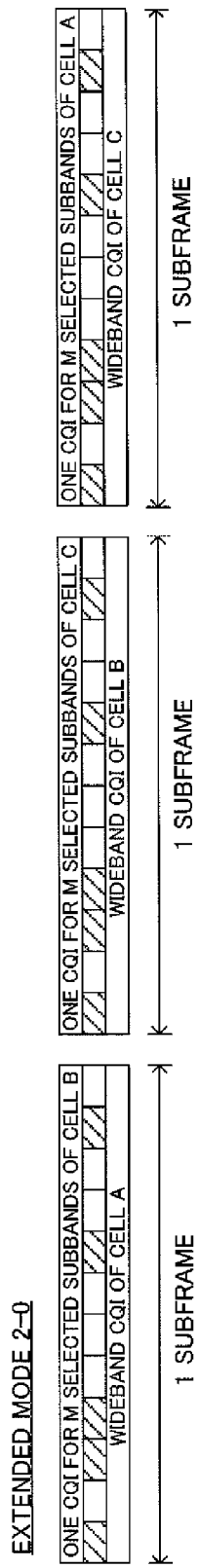
FIG. 11 is a diagram to show a CSI feedback information transmission format configuration in an extended PUSCH reporting mode (mode 2-0)

A user terminal where the new PUSCH reporting mode (extended mode 2-0) is applied allots and transmits CSI information of multiple cells (WB CQIs, SB position information, and CQIs (M-subband averages)) to PUSCHs in a plurality of subframes as shown in FIG. 11. The radio base station apparatus acquires the CSI of multiple cells from the PUSCHs received on the uplink. At the time three subframes of PUSCHs have been received, the CSI information of multiple cells A, B and C (WB CQIs, SB position information, and SB CQIs) is complete.

By this means, according to the new PUSCH reporting mode (extended mode 2-0), compared to the amount of information of CSI feedback information with the conventional PUSCH reporting mode (mode 2-0), the amount of information of CSI feedback information per feedback can be reduced.

<Seventh Mode: Extended Mode 2-2>

A new PUSCH reporting mode (extended mode 2-2), which is given by extending a conventional PUSCH reporting mode (mode 2-2) to reduce the overhead, will be described with reference to FIG. 12A.

In the conventional PUSCH reporting mode (mode 2-2), a user terminal selects M subbands having the largest CQI values from N subbands, and reports the average value of the CQI values of the M selected subbands (CQI), an optimal PMI for the average CQI value of the M selected subbands (PMI), a WB CQI, and a WB PMI to the radio base station apparatus. In the PUSCH reporting mode (mode 2-2), RI is reported in addition. For every one cell, the user terminal feeds back a WB CQI (4 or 8 bits)+SB CQIs (2 or 4 bits)+SB position information (L bits)+(an SB PMI+a WB PMI) (4 or 8 bits)+an RI (0-2 bits) to the radio base station apparatus using the PUSCH of one subframe. Consequently, there is a problem that, when the user terminal tries to feed back CSI information of multiple cells using the PUSCH in one subframe for CoMP, the overhead of the CSI feedback information increases.

A new PUSCH reporting mode (extended mode 2-2), which is given by extending a conventional PUSCH reporting mode (mode 2-2) to reduce the overhead, will be described with reference to FIG. 12A.

In the new PUSCH reporting mode (extended mode 2-2), CSI information of multiple cells (WB CQIs, WB PMIs, SB position information, average CQIs of M selected subbands, and optimal PMIs for the average CQIs of M selected subbands) is allotted to PUSCHs in a plurality of subframes and transmitted. As shown in FIG. 12A, when CoMP by three cells A, B and C is applied, in the PUSCH resources to be transmitted in the first subframe, the WB CQI of cell A (CQI A), the WB PMI of cell B (PMI B), an SB CQI to be the average CQI value of M subbands selected in cell A (CQI A), the average CQI value of the M subbands selected in cell A (CQI), an optimal PMI for the average CQI value of M subbands selected in cell B, and position information of the M subbands selected in cell B (the parts of diagonal lines in FIG. 12A) are arranged. In the PUSCH resources to be transmitted in a second subframe, the WB CQI of cell B (CQI B), the WB PMI of cell C (PMI C), the average CQI value of the M subbands selected in cell B (CQI), an optimal PMI for the average CQI value of M subbands selected in cell C (PMI), and position information of the M subbands selected in cell C (the parts of diagonal lines in FIG. 12A) are arranged. Furthermore, in the PUSCH resources to be transmitted in a third subframe, the WB CQI of cell C (CQI C), the WB PMI of cell A (PMI A), the average CQI value of the M subbands selected in cell C (CQI), an optimal PMI for the average CQI value of the M subbands selected in cell A (PMI), and position information of the M subbands selected in cell A (the parts of diagonal lines in FIG. 12A) are arranged.

A user terminal where the new PUSCH reporting mode (extended mode 2-2) is applied allots and transmits CSI information of multiple cells (WB CQIs, WB PMIs, SB position information, average CQI values (M subbands), and PMIs (which correspond to the average CQI values) in PUSCHs of a plurality of subframes, as shown in FIG. 12A. The radio base station apparatus acquires the CSI of multiple cells from the PUSCHs received on the uplink. At the time three subframes of PUSCHs have been received, the CSI information of multiple cells A, B and C (WB CQIs, WB PMI, SB position information, average CQI values (M subbands), and PMIs (which correspond to the average CQI values)) is complete.

By this means, according to the new PUSCH reporting mode (extended mode 2-0), compared to the amount of information of CSI feedback information with the conventional PUSCH reporting mode (mode 2-2), the amount of information of CSI feedback information per feedback can be reduced.

<Eighth Mode: Extended Mode 2-2, Transmission Mode 9 Using a Double Codebook>

Next, a new PUSCH reporting mode (extended mode 2-2, transmission mode 9 using a double codebook), which is given by extending a conventional PUSCH reporting mode (mode 2-2, transmission mode 9 using a double codebook) to reduce the overhead, will be described with reference to FIG. 12B.

In the conventional PUSCH reporting mode (mode 2-2, transmission mode 9 using a double codebook), CSI feedback information includes two kinds of WB PMIs (W1 and W2) for every one cell. Consequently, in the conventional PUSCH reporting mode (mode 2-2, transmission mode 9 using a double codebook), two kinds of WB PMI (W1) and WB PMI (W2), a WB CQI, SB position information, an average CQI value (M subbands), and a PMI (which corresponds to the average CQI value) are produced as CSI feedback information for every one cell. There is a problem that, when the user terminal tries to feed back CSI information of multiple cells using the PUSCH in one subframe for CoMP, the overhead of the CSI feedback information increases.

A new PUSCH reporting mode (extended mode 2-2, transmission mode 9 using a double codebook), which is given by extending a conventional PUSCH reporting mode (mode 2-2, transmission mode 9 using a double codebook) to reduce the overhead, will be described with reference to FIG. 12B.

In the new PUSCH reporting mode (extended mode 2-2, transmission mode 9 using a double codebook), CSI information of multiple cells (WB CQIs, two kinds of WB PMI (W1) and WB PMI (W2), SB position information, average CQI values (M selected subbands), and PMIs (which correspond to the average CQI value)) is allotted and transmitted in PUSCHs in a plurality of subframes. As shown in FIG. 12B, when CoMP by three cells A, B and C is applied, in the PUSCH resources to be transmitted in the first subframe, the WB CQI of cell A, the WB PMI of cell A (W1), the WB PMI of cell B (PMI B), the average CQI value of M subbands selected in cell A (CQI), an optimal PMI for the average CQI value of M subbands selected in cell B, and position information of the M subbands selected in cell B (the parts of diagonal lines in FIG. 12B) are arranged. In the PUSCH resources to be transmitted in a second subframe, the WB CQI of cell B, the WB PMI of cell B (W2), the WB PMI of cell C (W1), the average CQI value of the M subbands selected in cell B (CQI), an optimal PMI for the average CQI value of the M subbands selected in cell C, and position information of the M subbands selected in cell C (the parts of diagonal lines in FIG. 12B) are arranged. Furthermore, in the PUSCH resources to be transmitted in a third subframe, the WB CQI of cell C, the WB PMI of cell C (W2), the WB PMI of cell A (W2), the average CQI value of the M subbands selected in cell C (CQI), an optimal PMI for the average CQI value of the M subbands selected in cell A, and position information of the M subbands selected in cell A (the parts of diagonal lines in FIG. 12B) are arranged.

A user terminal where the new PUSCH reporting mode (extended mode 2-2, transmission mode 9 using a double codebook) is applied allots and transmits CSI information of multiple cells (WB CQIs, WB PMI (W1), WB PMI (W2), SB position information, average CQI values of selected subbands, and optimal PMIs for the average CQI values) in PUSCHs in a plurality of subframes, as shown in FIG. 12B. The radio base station apparatus acquires the CSI of multiple cells from the PUSCHs received on the uplink. At the time three subframes of PUSCHs have been received, the CSI information of multiple cells A, B and C (WB CQIs, WB PMI (W1), WB PMI (W2), SB position information, the average CQI values of M selected subbands, and the optimal PMIs for the average CQI value) is complete.

By this means, according to the new PUSCH reporting mode (extended mode 2-2, transmission mode 9 using a double codebook), compared to the amount of information of CSI feedback information with the conventional PUSCH reporting mode (mode 2-2, transmission mode 9 using a double codebook), the amount of information of CSI feedback information per feedback can be reduced.

Figure 13A:
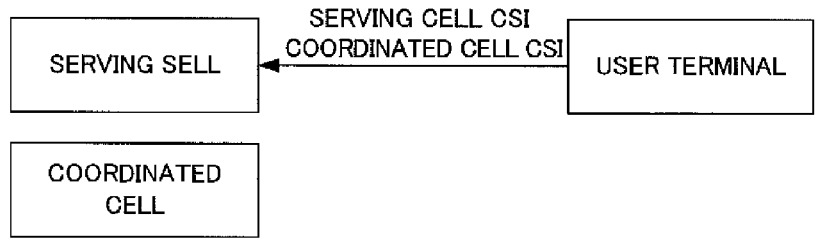
FIG. 13 provides diagrams to explain a CSI feedback mode type when CoMP is applied.

A case will be described here with this embodiment where a user terminal feeds back CSI of each cell adopting CoMP. A case has been described with the above embodiments where a user terminal feeds back each cell's CSI to the radio base station apparatus of a predetermined cell (serving cell) among a plurality of cells adopting CoMP (see FIG. 13A).

Figure 13B:
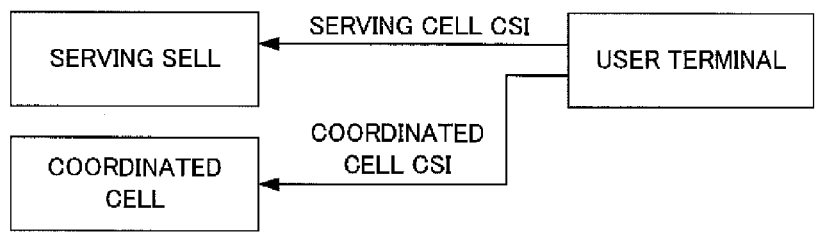

With the present embodiment, a user terminal may feed back each cell's CSI to the radio base station apparatus of the corresponding cell. To be more specific, the user terminal feeds back the CSI of the serving cell to the serving cell and feeds back the CSI of other cells (coordinated cells) to the corresponding coordinated cells (see FIG. 13B).

Figure 13C:
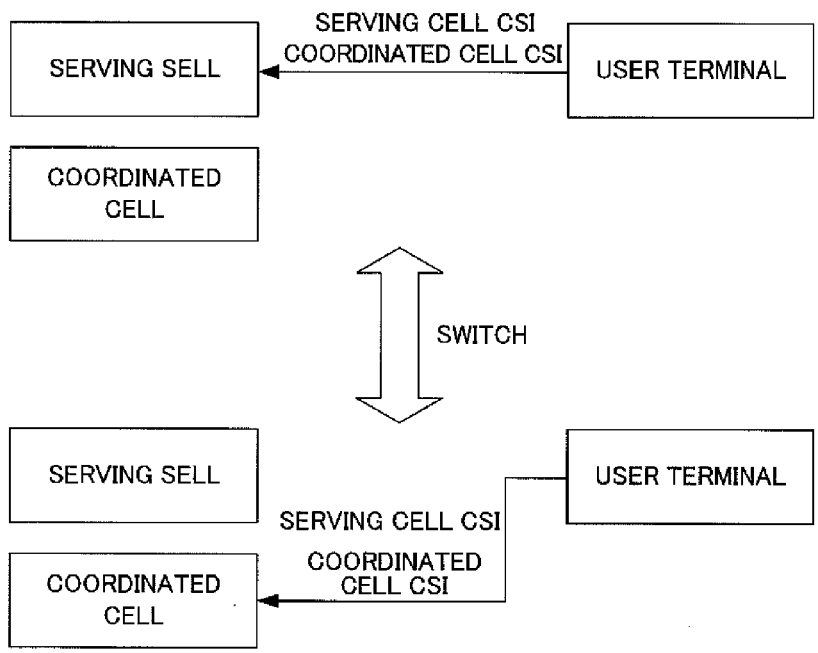

Also, as for cells where the uplink performance is good (received power is high), the user terminal may feed back the cells' CSI all together. For example, when two-cell CoMP is applied, the CSI of the cells is fed back to the cell of the better uplink performance between the serving cell and the coordinated cell. In this case, as shown in FIG. 13C, it is also possible to switch the cell to feed back CSI to, on a dynamic basis. In this case, the above first embodiment and the second embodiment can be applied as appropriate.

(Configuration of Radio Communication System)

Figure 14:
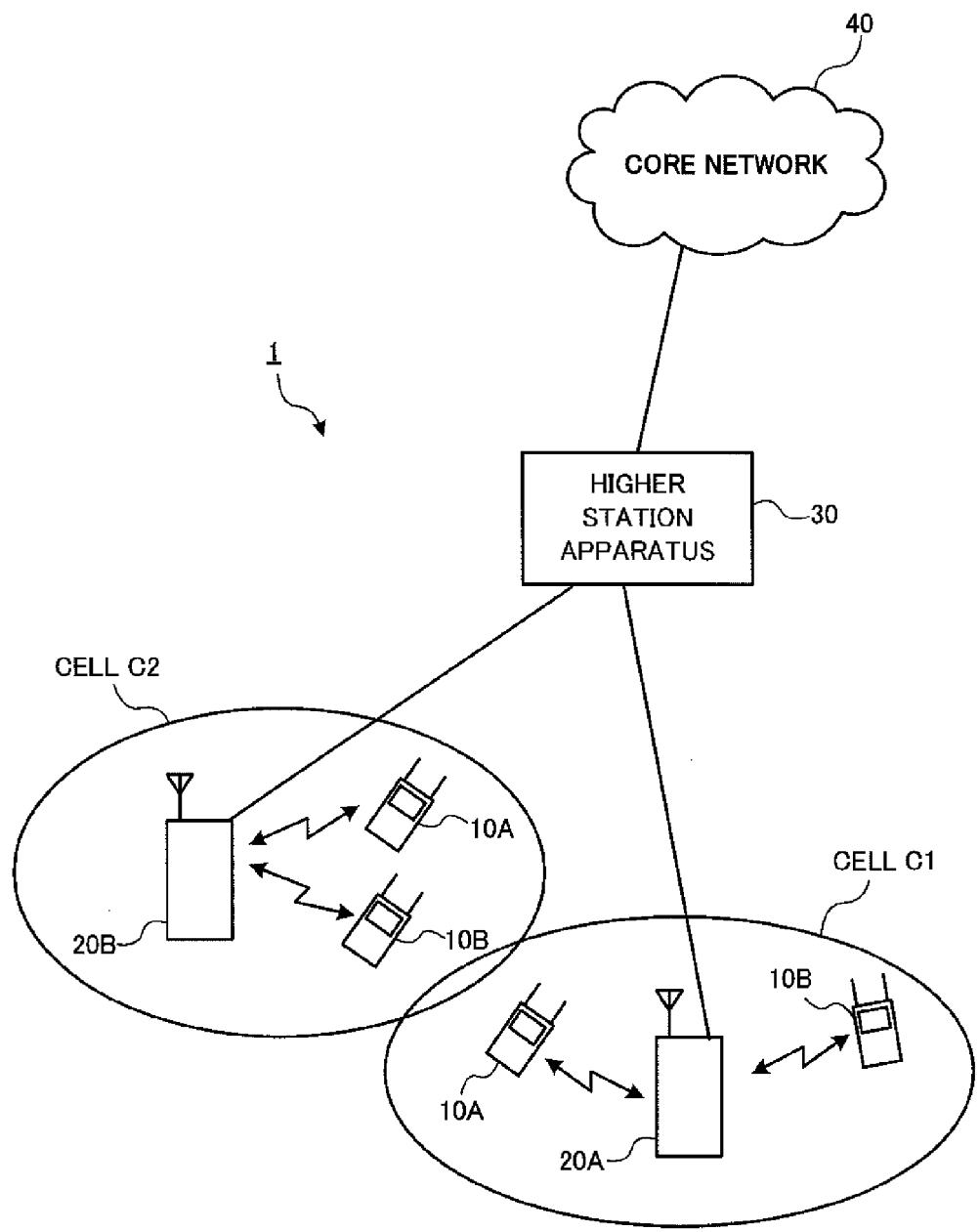
FIG. 14 is a diagram to explain a system configuration of a radio communication system.

Now, a radio communication system according to an embodiment of the present invention will be described in detail. FIG. 14 is a diagram to explain a system configuration of a radio communication system according to the present embodiment. Note that the radio communication system shown in FIG. 14 is a system to accommodate, for example, the LTE system or SUPER 3G. In this radio communication system, carrier aggregation to group a plurality of fundamental frequency blocks into one, where the system band of the LTE system is one unit, is used. Also, this radio communication system may be referred to as "IMT-Advanced" or may be referred to as "4G."

As shown in FIG. 14, the radio communication system 1 is configured to include radio base station apparatuses 20A and 20B to constitute transmission points, and a plurality of first and second user terminals 10A and 10B that communicate with these radio base station apparatuses 20A and 20B. The radio base station apparatuses 20A and 20B are connected with a higher station apparatus 30, and this higher station apparatus 30 is connected with a core network 40.

Also, the radio base station apparatuses 20A and 20B are connected with each other by wire connection or by wireless connection. The first and second user terminals 10A and 10B are able to communicate with the radio base station apparatuses 20A and 20B in cells C1 and C2. Note that the higher station apparatus 30 may be, for example, an access gateway apparatus, a radio network controller (RNC), a mobility management entity (MME) and so on, but is by no means limited to these. Also, between cells, when necessary, CoMP transmission is controlled by a plurality of base stations.

Although the first and second user terminals 10A and 10B may be either LTE terminals or LTE-A terminals, the following description will be given simply with respect to the first and second user terminals, unless specified otherwise. Also, although the first and second user terminals 10A and 10B will be described to perform radio communication with the radio base station apparatuses 20A and 20B, for ease of explanation, more generally, user equipment (UE) to include both mobile terminal apparatuses and fixed terminal apparatuses may be used as well.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Downlink communication channels include a PDSCH (Physical Downlink Shared Channel), which is used by the first and second user terminals 10A and 10B on a shared basis as a downlink data channel, and downlink L1/L2 control channels (PDCCH, PCFICH, PHICH). Transmission data and higher control signals (including PUSCH reporting mode command information) are transmitted by the PDSCH. Scheduling information for the PDSCH and the PUSCH and so on are transmitted by the PDCCH (Physical Downlink Control Channel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator Channel).

Uplink communication channels include a PUSCH (Physical Uplink Shared Channel), which is used by each user terminal on a shared basis as an uplink data channel, and a PUCCH (Physical Uplink Control Channel), which is an uplink control channel. Transmission data, downlink received quality information (CQI), ACK/NACK, and furthermore higher control information are transmitted by means of this PUSCH. Furthermore, the PUCCH transmits downlink received quality information (CQI), ACK/NACK, and so on.

An overall configuration of the radio base station apparatus according to the present embodiment will be described with reference to FIG. 15. Note that the radio base station apparatuses 20A and 20B have the same configuration and therefore hereinafter will be described simply as "radio base station apparatus 20." Also, the first and second user terminals 10A and 10B, which will be described later, also have the same configuration and therefore hereinafter will be described simply as "user terminal 10."

The radio base station apparatus 20 includes transmitting/receiving antennas 201, amplifying sections 202, transmitting/receiving sections (reporting sections) 203, a baseband signal processing section 204, a call processing section 205, and a transmission path interface 206. Transmission data to be transmitted from the radio base station apparatus 20 to the user terminal on the downlink is input from the higher station apparatus 30 into the baseband signal processing section 204 via the transmission path interface 206.

In the baseband signal processing section 204, a signal of a downlink data channel is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, a signal of a physical downlink control channel, which is a downlink control channel, is also subjected to transmission processes such as channel coding and an inverse fast Fourier transform.

Also, the baseband signal processing section 204 reports control information for allowing each user terminal 10 to perform radio communication with the radio base station apparatus 20, to the user terminals 10 connected to the same cell, by a broadcast channel. The information for allowing communication in the cell includes, for example, the uplink or downlink system bandwidth, root sequence identification information (root sequence index) for generating random access preamble signals in the PRACH (Physical Random Access Channel), and so on.

Baseband signals that are output from the baseband signal processing section 204 are converted into a radio frequency band in the transmitting/receiving sections 203. The amplifying sections 202 amplify the radio frequency signals having been subjected to frequency conversion, and output the results to the transmitting/receiving antennas 201. Note that the transmitting/receiving sections 203 constitute a receiving section configured to receive uplink signals including the CQIs and PMIs of multiple cells, and a transmitting section configured to transmit transmission signals by coordinated multiple point transmission.

Meanwhile, as for signals to be transmitted from the user terminal 10 to the radio base station apparatus 20 on the uplink, radio frequency signals received in the transmitting/receiving antennas 201 are amplified in the amplifying sections 202, converted into baseband signals through frequency conversion in the transmitting/receiving sections 203, and input in the baseband signal processing section 204.

The baseband signal processing section 204 performs an FFT process, an IDFT process, error correction decoding, a MAC retransmission control receiving process, and RLC layer and PDCP layer receiving processes, of the transmission data that is included in the baseband signal received on the uplink. The decoded signals are transferred to the higher station apparatus 30 through the transmission path interface 206.

The call processing section 205 performs call processing such as setting up and releasing communication channels, manages the state of the radio base station apparatus 20 and manages the radio resources.

Figure 15:
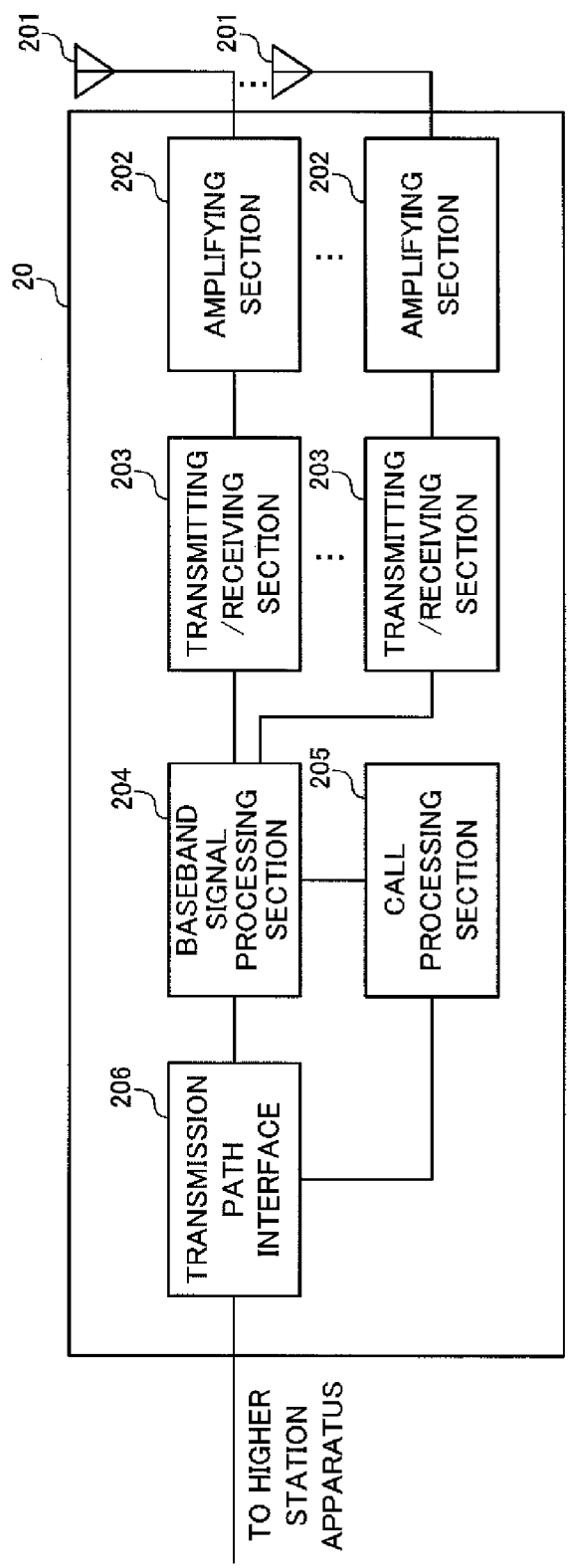
FIG. 15 is a diagram to explain an overall configuration of a radio base station apparatus.
Figure 16:
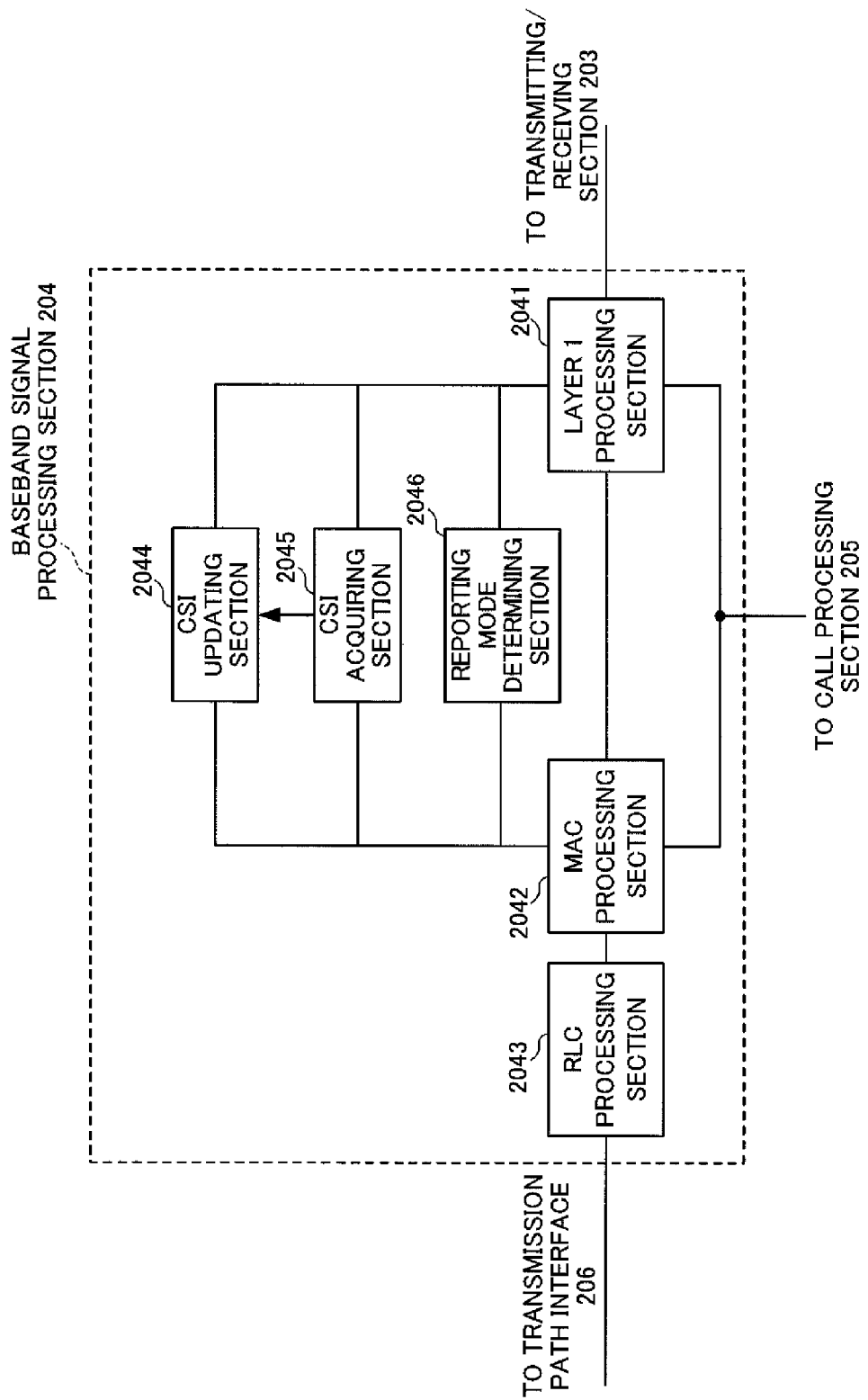
FIG. 16 is a functional block diagram corresponding to a baseband processing section of a radio base station apparatus.

FIG. 16 is a block diagram showing a configuration of a baseband signal processing section in the radio base station apparatus shown in FIG. 15. The baseband signal processing section 204 is primarily formed with a layer 1 processing section 2041, a MAC processing section 2042, an RLC processing section 2043, a CSI updating section 2044, a CST acquiring section 2045, and a reporting mode determining section 2046.

The layer 1 processing section 2041 mainly performs processes related to the physical layer. The layer 1 processing section 2041 performs processes for a signal received on the uplink, including, for example, channel decoding, a discrete Fourier transform (DFT), frequency demapping, an inverse fast Fourier transform (IFFT), data demodulation and so on. Also, the layer 1 processing section 2041 performs processes for a signal to transmit on the downlink, including channel coding, data modulation, frequency mapping, an inverse fast Fourier transform (IFFT) and so on.

The MAC processing section 2042 performs processes such as MAC layer retransmission control for a signal that is received on the uplink, scheduling for the uplink/downlink, transport format selection for the PUSCH/PDSCH, resource block selection for the PUSCH/PDSCH and so on.

The RLC processing section 2043 performs, for a packet that is received on the uplink/a packet to transmit on the downlink, packet division, packet combining, RLC layer retransmission control and so on.

The CSI acquiring section 2045 acquires each cell's CSI (for example, CQI), fed back from the user terminal using the PUSCH. The content of CSI to be fed back from the user terminal varies depending on the PUSCH reporting mode. In the case of the above extended PUSCH reporting modes (the first to eighth modes), as shown in FIGS. 7 to 12, the content of channel state information of multiple cells (WB CQIs, SB CQIs, WB PMIs, SB PMIs, average CQI values, PMIs for average CQI values) is allotted to PUSCHs in a plurality of subframes. For example, in the case of above FIG. 7 (extended mode 3-0), channel state information of three cells A, B and C (WB CQIs and SB CQIs) is allotted to PUSCHs in three subframes and transmitted from the user terminal, so that it is possible to acquire each CoMP cell's channel state information (WB CQIs and SB CQIs) by receiving the three subframe of PUSCHs.

Based on each cell's CSI acquired in the CSI acquiring section 2045, the CSI updating section 2044 recalculates and updates CSI (for example, CQI). When one of the first to eighth modes is applied, each cell's WB CQI, SB CQIs and so on are allotted to PUSCHs in a plurality of subframes and fed back, so that the CSI updating section 2044 is able to update CSI based on the latest CSI of each cell from CSI feedback information with reduced overhead.

The reporting mode determining section 2046 determines the reporting mode for selecting the channel state information which the user terminal feeds back using the PUSCH. The reporting mode determining section 2046 is able to determine the PUSCH reporting mode based on the channel state information acquired in the CSI acquiring section 2045 or the CSI update value calculated in the CSI updating section 2044, and so on. With this example, the PUSCH reporting mode is determined from extended mode 1-2, extended mode 2-0, extended mode 2-2, extended mode 3-0 and extended mode 3-1. Obviously, the reporting mode is not limited to these. The PUSCH reporting mode determined in the reporting mode determining section 2046 is reported to the user terminal via the transmitting/receiving sections 203 through higher layer signaling and so on.

Next, an overall configuration of a user terminal according to the present embodiment will be described with reference to FIG. 17. An LTE terminal and an LTE-A terminal have the same hardware configurations in principle parts, and therefore will be described indiscriminately. A user terminal 10 has transmitting/receiving antennas 101, amplifying sections 102, transmitting/receiving sections (receiving sections) 103, a baseband signal processing section 104, and an application section 105.

As for downlink data, radio frequency signals that are received in the transmitting/receiving antennas 101 are amplified in the amplifying sections 102, and subjected to frequency conversion and converted into baseband signals in the transmitting/receiving sections 103. The baseband signals are subjected to receiving processes such as an FFT process, error correction decoding and retransmission control, in the baseband signal processing section 104. In this downlink data, downlink transmission data is transferred to the application section 105. The application section 105 performs processes related to higher layers above the physical layer and the MAC layer. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT process, and an IFFT process. Baseband signals that are output from the baseband signal processing section 104 are converted into a radio frequency band in the transmitting/receiving sections 103. After that, the amplifying sections 102 amplify the radio frequency signals having been subjected to frequency conversion, and transmit the results from the transmitting/receiving antennas 101. Note that the transmitting/receiving sections 103 constitute a transmitting means to transmit information about phase differences, information about the connecting cells, selected PMIs and so on to the radio base station apparatus eNBs of a plurality of cells, and a receiving means to receive downlink signals.

Figure 17:
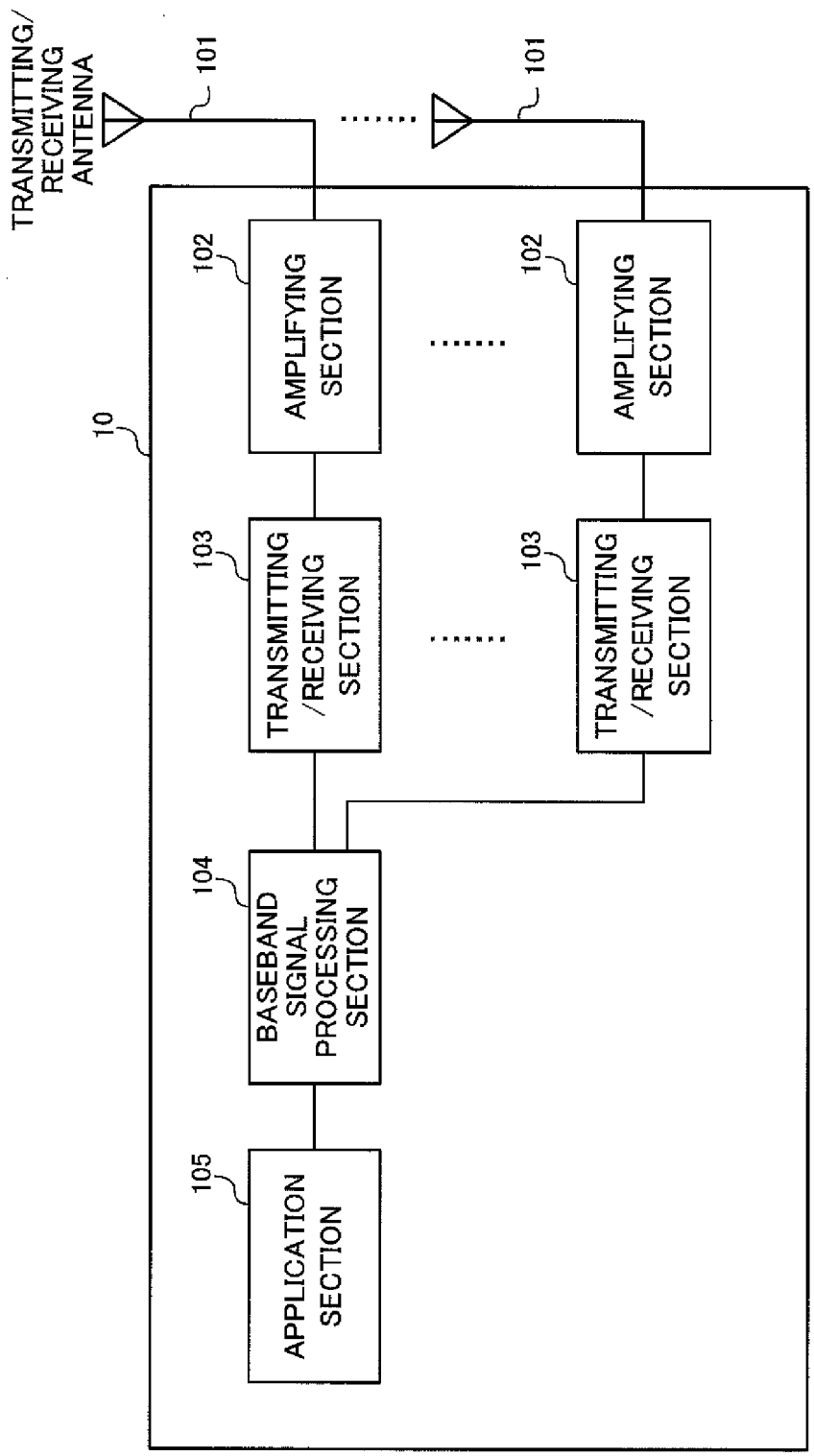
FIG. 17 is a diagram to explain an overall configuration of a user terminal.
Figure 18:
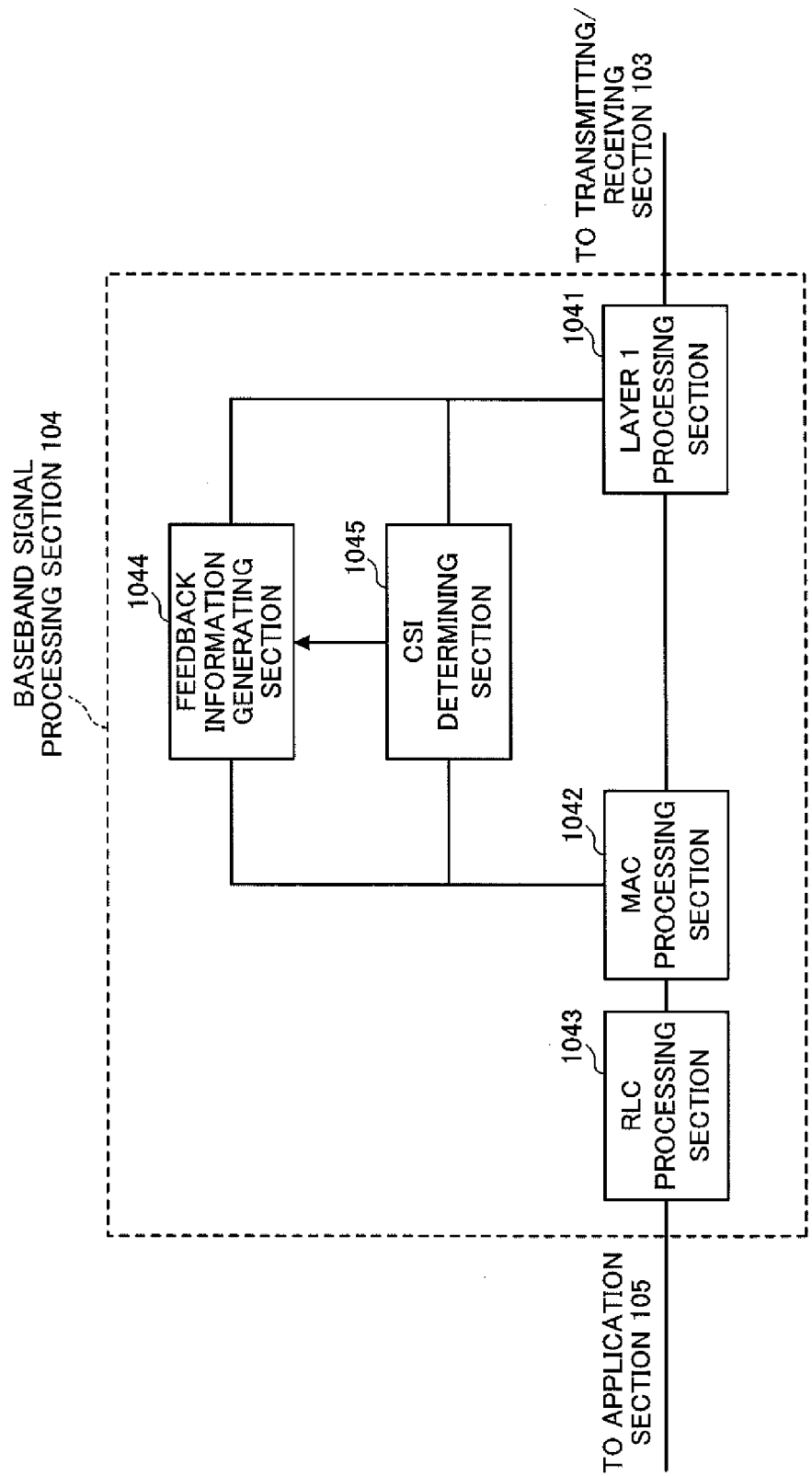
FIG. 18 is a functional block diagram corresponding to a baseband processing section of a user terminal.

FIG. 18 is a block diagram showing a configuration of a baseband signal processing section in the user terminal shown in FIG. 17. The baseband signal processing section 104 is primarily formed with a layer 1 processing section 1041, a MAC processing section 1042, an RLC processing section 1043, a feedback information generating section 1044, and a CSI determining section 1045.

The layer 1 processing section 1041 mainly performs processes related to the physical layer. The layer 1 processing section 1041 performs processes for a signal that is received on the downlink, including, for example, channel decoding, a discrete Fourier transform (DFT), frequency demapping, an inverse fast Fourier transform (IFFT), data demodulation and so on. Also, the layer 1 processing section 1041 performs processes for a signal to transmit on the uplink, including channel coding, data modulation, frequency mapping, an inverse fast Fourier transform (IFFT), and so on.

The MAC processing section 1042 performs, for a signal that is received on the downlink, MAC layer retransmission control (HARQ), an analysis of downlink scheduling information (specifying the PDSCH transport format and specifying the PDSCH resource blocks) and so on. Also, the MAC processing section 1042 performs processes for a signal to transmit on the uplink, such as MAC retransmission control, an analysis of uplink scheduling information (specifying the PUSCH transport format and specifying the PUSCH resource blocks) and so on.

The RLC processing section 1043 performs, for a packet received on the downlink/a packet to transmit on the uplink, packet division, packet combining, RLC layer retransmission control, and so on.

The CSI determining section 1045 determines each cell's channel state information (WB CQI, WB PMI, SB CQIs, SB PMIs, WB RI and so on). For example, the CSI determining section 1045 calculates WB CQIs and SB CQIs from the desired signals of the cells, interference signals, interference of cells apart from the CoMP set, thermal noise and so on. Each cell's CSI, determined in the CSI determining section 1045, is output to the feedback information generating section 1044.

The feedback information generating section 1044 generates feedback information (CSI and so on). The CSI may include each cell's WB CQI, WB PMI, SB CQIs, SB PMIs, WB RI, phase difference information and so on. Also, the feedback information generating section 1044 generates feedback information based on the reporting mode determined in and reported from the reporting mode determining section 2046 of the radio base station apparatus.

Also, the feedback information generating section 1044 also generates retransmission control signals (ACK/NACK), which show whether or not the user terminal has received data signal adequately, as feedback information. These signals generated in the feedback information generating section 1044 are fed back to the radio base station apparatus using the PUSCH or the PUCCH.

In the cases of the above first to eighth modes, the feedback information generating section 1044 generates feedback information such that channel state information of multiple cells is allotted to PUSCHs in multiple subframes and transmitted.

Also, in the case of extended mode 3-0 to report SB CQIs and WB CQIs, the feedback information generating section 1044 generates feedback information such that, in the PUSCH in one subframe, the SB CQIs of multiple cells and the WB CQI of one cell are arranged, the WB CQIs of different cells are arranged between subframes, and the SB CQIs of all cells are allotted within a predetermined number of subframes. In this way, the SB CQIs of all cells (part of the subbands) are allotted to be included in the PUSCH of one subframe, so that an effect of reducing the feedback delay can be achieved. Also, in the case of extended mode 3-1 to report SB CQIs, WB CQIs and WB CQIs, the feedback information generating section 1044 generates feedback information such that, in the PUSCH in one subframe, the SB CQIs of multiple cells, the WB CQI of one cell and the WB PMI of another cell are arranged, the WB CQIs and WB PMIs of different cells are arranged between subframes, and the SB CQIs of all cells are allotted within a predetermined number of subframes. In this way, in the PUSCH to be transmitted in one subframe, the WB CQI and WB PMI of the same cell are arranged, so that an effect of reducing the feedback delay can be achieved. In the case of extended mode 1-2 to report SB PMIs and WB CQIs, the feedback information generating section 1044 generates feedback information such that, in the PUSCH in one subframe, the SB PMIs of multiple cells and the WB CQI of one cell are arranged, the WB CQIs of varying cells are arranged between subframes, and the SB PMIs of all cells are allotted within a predetermined number of subframes. In this way, in the PUSCH to be transmitted in one subframe, all the SB PMIs of the same cell are arranged, so that an effect of reducing the feedback delay can be achieved. Also, in the case of extended mode 2-0 to report SB CQIs, position information of the SB CQIs and one cell's WB CQI, the feedback information generating section 1044 generates feedback information such that, in the PUSCH of one subframe, one cell's WB CQI, the SB CQIs of another cell and position information of the SB CQIs of the other cell are arranged, the WB CQIs of different cells are arranged between subframes, and the SB CQIs of other cells and position information of the SB CQIs of other cells are arranged. Furthermore, in the case of extended mode 2-2 to report SB CQIs, SB PMIs, position information of the SB PMIs (SB CQIs) and WB PMIs, the feedback information generating section 1044 generates feedback information such that, in the PUSCH of one subframe, one cell's WB CQI, the SB CQIs of that cell, the WB PMI of another cell, the SB PMIs of the other cell, and position information of the SB PMIs of the other cell are arranged, and different WB CQIs, WB PMIs, SB CQIs and SB PMIs are arranged between subframes.

In a radio communication system having the above configuration, each cell's CSI (WB CQI, WB PMI, SB CQIs, SB PMIs, WB RI and so on) is calculated in the CSI determining section 1045 of the user terminal. Then, the determined CSI is output to the feedback information generating section 1044. The feedback information generating section 1044 generates feedback information such that channel state information of multiple cells is allotted to and transmitted in PUSCHs in a plurality of subframes. At this time, the feedback information generating section 1044 selects the CSI to feed back based on the reporting mode determined in and reported from the reporting mode determining section 2046 of the radio base station apparatus. Then, the feedback information generating section 1044 feeds back each cell's CSI to the radio base station apparatus.

The radio base station apparatus updates CSI using the CSI of multiple cells fed back from the user terminal. Also, the reporting mode determining section 2046 of the radio base station apparatus determines the reporting mode based on CSI that is fed back or the updated value of CSI, and reports it to the user terminal.

In this way, with the radio communication method according to the present embodiment, when CoMP transmission is applied, it is possible to reduce the overhead upon feeding back CSI feedback information of multiple cells to a radio base station apparatus.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-067844, filed on Mar. 23, 2012, including the specification, drawings and abstract, is incorporated herein by reference in its entirety.

The invention claimed is:

1. A radio communication system comprising:
a plurality of radio base station apparatuses, and
a user terminal that performs coordinated multiple point transmission/reception with the plurality of radio base station apparatuses,
the user terminal comprises:
a processor of the user terminal that generates feedback information such that channel state information of multiple cells is separately allotted to a plurality of subframes; and
a transmitter that feeds back the generated feedback information to the radio base station apparatus of one of multiple coordinated points, using a physical uplink shared data channel; and
the radio base station apparatus comprises:
a processor of the radio base station that updates the channel state information using the channel state information that is allotted in the plurality of subframes and fed back from the user terminal,
wherein the processor of the user terminal generates the feedback information in each subframe that includes at least a subset of the channel state information of multiple cells, and
wherein the processor of the user terminal generates the feedback information in which at least a channel quality indicator of an entire system band in one cell and a channel quality indicator of a subband of a different cell or Precoding Matrix Indicator (PMI) of the subband of the different cell are arranged in a physical uplink shared data channel in one subframe.

2. The radio communication system according to claim 1, wherein the transmitter feeds back the channel state information using a physical uplink shared data channel that is periodically allocated to uplink radio resources.

3. The radio communication system according to claim 1, wherein the transmitter feeds back the channel state information using a physical uplink shared data channel that is aperiodically allocated to uplink radio resources.

4. The radio communication system according to claim 1, wherein, in a mode to report channel quality indicators of N subbands constituting a system band and a channel quality indicator of an entire system band, the processor of the user terminal generates feedback information in which channel quality indicators of multiple cells and a channel quality indicator of the entire system band in one cell are arranged in a physical uplink shared data channel in one subframe.

5. The radio communication system according to claim 1, wherein, in a mode to report channel quality indicators of N subbands constituting a system band, a channel quality indicator of an entire system band, and a PMI (Precoding Matrix Indicator) for the entire system band, the processor of the user terminal generates feedback information in which channel quality indicators of multiple cells, a channel quality indicator of the entire system band in one cell, and a PMI for the entire system band in another cell are arranged in a physical uplink shared data channel in one subframe.

6. The radio communication system according to claim 1, wherein, in a mode to report PMIs of N subbands constituting a system band and a channel quality indicator of an entire system band, the processor of the user terminal generates feedback information in which PMIs of subbands in multiple cells and a channel quality indicator of the entire system band in one cell are arranged in a physical uplink shared data channel in one subframe.

7. The radio communication system according to claim 1, wherein, in a mode to report channel quality indicators of M subbands having larger channel quality indicators and selected from N subbands constituting a system band, position information of the M selected subbands, and a channel quality indicator of an entire system band in one cell, the processor of the user terminal generates feedback information in which the channel quality indicator of the entire system band in one cell, channel quality indicators of subbands in another cell, and position information of M selected subbands in the other cell are arranged in a physical uplink shared data channel in one subframe.

8. The radio communication system according to claim 1, wherein, in a mode to report an average value of channel quality indicators of M subbands having larger channel quality indicators and selected from N subbands constituting a system band, a PMI to correspond to the average value of the channel quality indicators, position information of the M selected subbands, and a PMI for an entire system band, the processor of the user terminal generates feedback information in which a channel quality indicator of the entire system band in one cell, an average value of channel quality indicators of M selected subbands in the cell, a PMI for the entire system band in another cell, a PMI to correspond to an average value of channel quality indicators of M selected subbands in the other cell and position information of the M selected subbands in the other cell are arranged in a physical uplink shared data channel in one subframe.

9. The radio communication system according to claim 1, wherein the user terminal feeds back channel state information of a serving cell, which is a first transmission point among the plurality of radio base station apparatuses, to the serving cell, and feeds back channel state information of a coordinated cell, which is a second transmission point, to the corresponding coordinated cell.

10. A user terminal that is configured to be able to perform coordinated multiple point transmission/reception with a plurality of radio base station apparatuses, the user terminal comprising:
a processor that generates feedback information such that channel state information of multiple cells is separately allotted to a plurality of subframes; and
a transmitter configured to feed back the generated feedback information to the radio base station apparatus of one of multiple coordinated points, using a physical uplink shared data channel,
wherein the processor generates the feedback information in each subframe that includes at least a subset of the channel state information of multiple cells, and
wherein the processor of the user terminal generates the feedback information in which at least a channel quality indicator of an entire system band in one cell and a channel quality indicator of a subband of a different cell or Precoding Matrix Indicator (PMI) of the subband of the different cell are arranged in a physical uplink shared data channel in one subframe.

11. A radio base station apparatus that coordinates with another radio base station apparatus and performs coordinated multiple point transmission/reception with a user terminal, the radio base station apparatus comprising:
a processor that determines a reporting mode that matches channel state information which the user terminal feeds back using a physical uplink shared data channel;
a transmitter configured to report the determined reporting mode to the user terminal; and
a receiver that receives channel state information of multiple cells, which the user terminal allots and transmits in multiple subframes, in accordance with the reported reporting mode, via a physical uplink shared data channel;
wherein the processor updates the channel state information using the channel state information of multiple cells that is allocated and received in multiple subframes, and
wherein the receiver receives feedback information in each subframe that includes at least a subset of the channel state information of multiple cells, and
wherein the processor of the user terminal generates the feedback information in which at least a channel quality indicator of an entire system band in one cell and a channel quality indicator of a subband of a different cell or Precoding Matrix Indicator (PMI) of the subband of the different cell are arranged in a physical uplink shared data channel in one subframe.

12. A radio communication method for a plurality of radio base station apparatuses and a user terminal that is configured to be able to perform coordinated multiple point transmission/reception with the plurality of radio base station apparatuses, the radio communication method comprising the steps of:
at the user terminal, generating feedback information such that channel state information of multiple cells is separately allotted to a plurality of subframes;
at the user terminal, feeding back the generated feedback information to the radio base station apparatus of one of multiple coordinated points, using a physical uplink shared data channel; and
at the radio base station apparatus, updating the channel state information using the channel state information that is allotted in the plurality of subframes and fed back from the user terminal,
wherein, at the user terminal, generating the feedback information in each subframe that includes at least a subset of the channel state information of multiple cells, and
wherein the processor of the user terminal generates the feedback information in which at least a channel quality indicator of an entire system band in one cell and a channel quality indicator of a subband of a different cell or Precoding Matrix Indicator (PMI) of the subband of the different cell are arranged in a physical uplink shared data channel in one subframe.

* * * * *